US011305580B2

(12) United States Patent
Gregg et al.

(10) Patent No.: US 11,305,580 B2
(45) Date of Patent: Apr. 19, 2022

(54) AXLE AND SPINDLE FOR HEAVY-DUTY VEHICLE AND METHOD

(71) Applicant: Hendrickson USA, L.L.C., Schaumburg, IL (US)

(72) Inventors: Dane Gregg, Uniontown, OH (US); Phillippi R. Pierce, Canton, OH (US); Jay D. White, North Canton, OH (US); Jeffrey R. Wittlinger, Uniontown, OH (US); Nicholas M. Meyer, Wadsworth, OH (US); Siddharth David, Canton, OH (US); Keith M. Ernenwein, North Canton, OH (US)

(73) Assignee: Hendrickson USA, L.L.C., Schaumburg, IL (US)

( * ) Notice: Subject to any disclaimer, the term of this patent is extended or adjusted under 35 U.S.C. 154(b) by 373 days.

(21) Appl. No.: 16/551,865

(22) Filed: Aug. 27, 2019

(65) Prior Publication Data
US 2020/0070574 A1 Mar. 5, 2020

Related U.S. Application Data

(60) Provisional application No. 62/724,716, filed on Aug. 30, 2018.

(51) Int. Cl.
*B60B 35/08* (2006.01)
*B60B 35/04* (2006.01)
(Continued)

(52) U.S. Cl.
CPC .............. *B60B 35/08* (2013.01); *B21D 53/90* (2013.01); *B23K 20/12* (2013.01); *B60B 27/001* (2013.01);
(Continued)

(58) Field of Classification Search
CPC ......... B60B 35/02; B60B 35/04; B60B 35/08; B60B 27/00; B60B 27/001; B60B 27/0068; B60B 27/02; B21D 53/90
See application file for complete search history.

(56) References Cited

U.S. PATENT DOCUMENTS 2,851,315 A * 9/1958 Zavoda ................. F16C 19/364
384/486
3,465,545 A * 9/1969 Stamm ................. B23K 20/129
464/179
(Continued)

FOREIGN PATENT DOCUMENTS

DE 2159209 11/1971
DE 29613405 U1 8/1996
(Continued)

*Primary Examiner* — Jason R Bellinger
(74) *Attorney, Agent, or Firm* — Dureska & Moore, LLC; David P. Dureska; Benjamin J. Chojnacki

(57) ABSTRACT

An axle assembly includes a central tube and an axle spindle. The axle spindle is fixed to the central tube. The axle spindle has a tubular first section and a tubular second section extending from the first section. The second section has an outer diameter. The second section has a bearing support surface. A tubular transition section is located between the first section and the second section. An annular shoulder portion is formed in an axial end segment of the tubular transition section adjacent the second section. The shoulder portion has at least one annular profile located in the shoulder portion between the annular shoulder surface and the bearing support surface. The annular profile is defined by a surface with a diameter not less than the outer diameter of the second section. An antilock braking system sensor bracket locator nub is integrally formed in the tubular transition section. An antilock braking system sensor bracket engages the antilock braking system sensor bracket locator nub for proper positioning of an antilock braking system sensor.

18 Claims, 26 Drawing Sheets

(51) Int. Cl.
*B60B 27/00* (2006.01)
*B60B 27/02* (2006.01)
*B23K 20/12* (2006.01)
*B21D 53/90* (2006.01)

(52) U.S. Cl.
CPC .......... *B60B 27/0068* (2013.01); *B60B 27/02* (2013.01); *B60B 35/04* (2013.01); *B60B 2310/3025* (2013.01); *B60Y 2200/142* (2013.01); *B60Y 2200/147* (2013.01); *B60Y 2200/148* (2013.01)

(56) References Cited

U.S. PATENT DOCUMENTS

| | | | |
|---|---|---|---|
| 4,298,155 A | 11/1981 | Palovcik | |
| 4,363,522 A | 12/1982 | Palovcik | |
| 4,492,019 A * | 1/1985 | Wells | B60B 37/06 29/447 |
| 4,768,839 A * | 9/1988 | Spindler | B23K 20/129 301/124.1 |
| 6,457,869 B1 * | 10/2002 | Smith | B60B 27/001 384/448 |
| 6,983,999 B2 | 1/2006 | Goettker | |
| 10,202,002 B2 * | 2/2019 | Carroll | B60B 35/025 |
| 10,589,567 B2 * | 3/2020 | Iliev | B60B 27/0068 |
| 2010/0301665 A1 * | 12/2010 | White | B23P 15/00 301/105.1 |
| 2011/0291468 A1 | 12/2011 | Rieger | |
| 2015/0308508 A1 | 10/2015 | Hartling et al. | |
| 2015/0316040 A1 | 11/2015 | Golebiowski et al. | |
| 2018/0117965 A1 | 5/2018 | Gregg et al. | |
| 2018/0370565 A1 * | 12/2018 | White | B60T 1/065 |

FOREIGN PATENT DOCUMENTS

| | | |
|---|---|---|
| DE | 29815470 U1 | 8/1998 |
| DE | 20023425 U1 | 10/2000 |
| DE | 102006024622 A1 | 11/2007 |
| DE | 1020140106519 A1 | 11/2015 |

* cited by examiner

AXLE AND SPINDLE FOR HEAVY-DUTY VEHICLE AND METHOD

CROSS-REFERENCE TO RELATED APPLICATIONS

This application claims the benefit of U.S. Provisional Patent Application Ser. No. 62/724,716 filed Aug. 30, 2018.

TECHNICAL FIELD

The disclosed subject matter generally relates to axles for vehicles. Particularly, the disclosed subject matter relates to an axle assembly for use in heavy-duty vehicles. The axle assembly includes an improved axle spindle with a profile that reduces stress concentration in the axle spindle. The axle spindle includes an integral ABS sensor bracket mounting locator. The disclosed subject matter also relates to methods of manufacturing the axle assembly and manufacturing the axle spindle.

BACKGROUND

Heavy-duty vehicles, such as trucks, tractor-trailers or trailers, typically utilize one or more axle assemblies. An axle assembly includes a pair of wheel end assemblies which are fixed to respective opposite ends of an axle central tube. Each wheel end assembly includes a hub that is supported on an axle spindle for relative rotation by a bearing system. The bearing system includes an inboard bearing and an outboard bearing. The axle spindle has an attachment end portion, or skirt, with an outer diameter that is substantially equal to an outer diameter of an end portion of the axle central tube to which the axle spindle will be attached.

The axle spindle includes a cylindrical outer bearing surface for supporting at least the inboard bearing of the bearing system. The cylindrical outer bearing surface has an outer diameter that is smaller than the outer diameter of the attachment end portion of the axle spindle. Thus, there is a transition zone of decreasing outer diameter that extends from the attachment end portion of the axle spindle in a direction toward the cylindrical outer bearing surface.

The axle spindle has a shoulder region at an end of the transition zone. The shoulder region has an annular end surface that extends perpendicular to the cylindrical outer bearing surface. The annular end surface contact surface of the shoulder region engages the inboard bearing to position the inboard bearing along the axle spindle. An axle spindle nut configuration is threaded onto an end portion of the axle spindle to secure the bearing system on the axle spindle and to maintain the position of the bearings.

The transition zone and the shoulder region typically experience relatively heavy loads and forces during operation of heavy-duty vehicles. The relatively heavy loads and forces result in relatively high localized strain resulting in relatively large stress concentrations in the transition zone and the shoulder region. Depending on the design geometry in the transition zone and shoulder region, the axle spindle could have a relatively high rate of change in section modulus that could detrimentally affect the axle spindle. The axle spindle must be robust enough to withstand the relatively heavy loads and forces with associated relatively high stress and strain.

The axle spindle is formed during the manufacturing process with a large amount of material, such as steel, to be robust to withstand the relatively heavy loads and forces that the axle spindle experiences. This typically results in the axle spindle being relatively thick in the shoulder region and transition zone. This relatively thick area of the axle spindle is also formed for manufacturing reasons and for mounting accessory hardware. Therefore, the axle spindle can be relatively heavy that adds to the overall weight of the heavy-duty vehicle which results in a reduction in weight of the cargo that the heavy-duty vehicle may carry.

The annular end surface of the shoulder region is subject to wear, fretting, galling or deformation due to the relatively high axial forces applied by the inboard bearing during operation of the heavy-duty vehicle. Wear, fretting, galling or deformation of the annular end surface of the shoulder region, and possibly of the inboard bearing, occurs by constant contact and relatively high axial loads applied by the inboard bearing to the shoulder region. Such wear, fretting, galling or deformation can create excessive end play of the bearing system on the axle spindle and introduce resultant contaminants into the bearing system.

At least one attempt to eliminate the relatively thick axle spindle in the transition zone involved joining a separately manufactured collar to an axle spindle body formed from a hollow tube. The axle spindle body was produced by cold forming the hollow tube. The collar provides a bearing stop surface. However, this attempt involves additional machining and manufacturing operations to produce the collar and then welding or otherwise joining the collar to the transition zone of the axle spindle body. Care must be taken in positioning the collar axially on the axle spindle body to provide a proper location of the bearing stop surface on the finished axle spindle assembly. In order to properly locate the bearing stop surface on the axle spindle body, a frusto-conical inner surface was machined on the collar that approximates the angle at which the transition zone extends. Manufacturing tolerances of the outer surface of a cold formed axle spindle body are generally greater than tolerances of a machining operation used on the collar. This collar and axle spindle body assembly may not produce desired location of the bearing stop surface or the squareness of the collar relative to the axle spindle body. All these additional steps and procedures tend to increase cost of manufacturing the axle spindle and increase the lead time to produce the axle spindle.

It is also known in another attempt that, for manufacturing reasons, a solid axle spindle is provided with a disruptive radial plunge cut in a bearing journal surface near a shoulder end surface. This plunge cut allows a roller burnishing tool to contact the bearing journal to yield a desired finish to the surface of the bearing journal. This configuration may not be optimal for the axle spindle to withstand the relatively heavy loads and large forces during operation of the heavy-duty vehicle.

The disadvantages associated with some previously known axle spindles make it desirable to develop an improved axle spindle that is relatively light in weight. It is also desirable to develop an improved axle spindle that has a shoulder region that may better withstand localized stress and strain and to minimize the wear, fretting, galling and/or deformation of the shoulder during operation of the heavy-duty vehicle. It is also desirable to provide an axle spindle with a relatively low rate of change in section modulus, especially in the shoulder region. It is desirable to provide a method of manufacturing the improved axle spindle. It is also desirable to provide an improved axle spindle capable of using standard or stock bearings or that may incorporate custom bearings which can benefit from advantageous features of the improved axle spindle. It is also desirable to provide a one-piece integrally formed tubular axle spindle that can reduce material costs and increase axle spindle and bearing life. It is further desirable to provide an axle spindle with means to easily locate and mount an antilock braking system sensor bracket.

SUMMARY

A summary is provided to introduce concepts of the disclosed subject matter in a form that are described below. This summary is not intended to identify key factors or essential features of the disclosed subject matter, nor is it intended to limit the scope of the disclosed subject matter.

The disadvantages associated with known axle spindles are overcome with an axle assembly and axle spindle constructed and manufactured according to the disclosed subject matter. The concepts of the disclosed subject matter provide a relatively lighter weight one-piece integrally formed tubular axle spindle that can withstand localized stress concentrations encountered during operation of a heavy-duty vehicle, reduce material costs and increase axle spindle and bearing life. The disclosed subject matter also provides a way to efficiently locate and mount an antilock braking system answer bracket. The improved axle spindle has a relatively low rate of change in section modulus. The improved axle spindle is capable of using standard or stock bearings or that may incorporate custom bearings which can benefit from the improved features of the disclosed subject matter. The disclosed subject matter further provides a manufacturing method for an axle assembly and axle spindle.

The disclosed subject matter provides an axle assembly for a heavy-duty vehicle. The axle assembly includes a central tube and an axle spindle fixed to the central tube. The axle spindle receives at least one bearing assembly to support a hub for relative rotation. The axle spindle has a tubular first cylindrical section with a first outer diameter. An end surface on the first cylindrical section connects to the central tube of the axle spindle. A tubular second cylindrical section is integrally formed with and extends in a direction away from the first cylindrical section. The second section has at least one bearing support surface to receive and support a bearing assembly of the hub. The second section has a second outer diameter less than the first outer diameter. A tubular transition section is integrally formed with and located between the first cylindrical section and the second cylindrical section. The tubular transition section includes a chucking land pad. The chucking land pad engages a tool to cause relative rotation between the central tube and the axle spindle to create a friction weld.

An arcuate surface may define the chucking land pad. The arcuate surface extends substantially coaxially with at least one of the first cylindrical section or the tubular second cylindrical section. The chucking land pad may be a continuous cylindrical surface.

The axle spindle has an antilock braking system sensor bracket locator nub formed in the tubular transition section of the axle spindle. An antilock braking system bracket engages a surface of the antilock braking system sensor bracket locator nub and is fixed to the axle spindle.

An annular shoulder portion is formed at an end of the transition section adjacent the second cylindrical section. The shoulder portion has an annular shoulder surface for engaging an annular surface of the bearing assembly. The tubular transition section may have a rate of change in section modulus taken at an axial location between adjacent sections spaced apart in 0.050 inch increments from the annular shoulder surface in a direction toward the end surface of the tubular first cylindrical section that varies no more than about 14%.

At least one surface forms an annular profile located between the annular shoulder surface and the bearing support surface. The annular profile is defined by a surface having a third diameter that is not less than the second diameter of the bearing support surface of the tubular second cylindrical section.

The annular profile may include a first annular surface with a first radius taken in a plane containing a longitudinal central axis of the axle spindle. The first annular surface is located between the annular shoulder surface and the bearing support surface. The annular profile may also include a second annular surface with a second radius taken in a plane containing a longitudinal central axis of the axle spindle. The second annular surface is located between the first annular surface and the bearing support surface. The second radius of the second annular surface may be greater than the first radius of the first annular surface.

The annular profile may include a frustoconical segment extending radially inward from the annular shoulder surface. The annular profile may also have a radiused surface located between the frustoconical segment and the bearing support surface.

The disclosed subject matter also provides a method of making an axle assembly and an axle spindle for a heavy-duty vehicle. The method comprises the steps of providing a central tube and a hollow member. The axle spindle is produced by forming a first cylindrical section on the hollow member and has a first diameter. A second cylindrical section is formed on the hollow member integrally with and extending in a direction away from the first cylindrical section. The second cylindrical section has a second diameter less than the first diameter. A transition section is formed on the hollow member integrally with, and located between, the first cylindrical section and the second cylindrical section. The transition section tapers from the first cylindrical section to the second cylindrical section. A chucking land pad is formed on the transition section.

The axle assembly results when the axle spindle is friction welded to the central tube by a tool engaging the chucking land pad and rotating the axle spindle relative to the central tube. The chucking land pad is machined away to form a finished transition section. During the machining operation, an antilock braking system sensor bracket locator nub is formed. An antilock braking system sensor bracket is located on the antilock braking system sensor bracket locator nub. The antilock braking system sensor bracket is fixed to the axle spindle.

DRAWINGS

The following description and accompanying drawings set forth certain illustrative aspects and implementations of the disclosed subject matter. These are indicative of but a few of the various ways in which one or more aspects or implementations of the disclosed subject matter may be employed. Further features of the disclosed subject matter may become apparent to those skilled in the art from reading the description with reference to the accompanying drawings, in which.

DESCRIPTION

Figure 1:
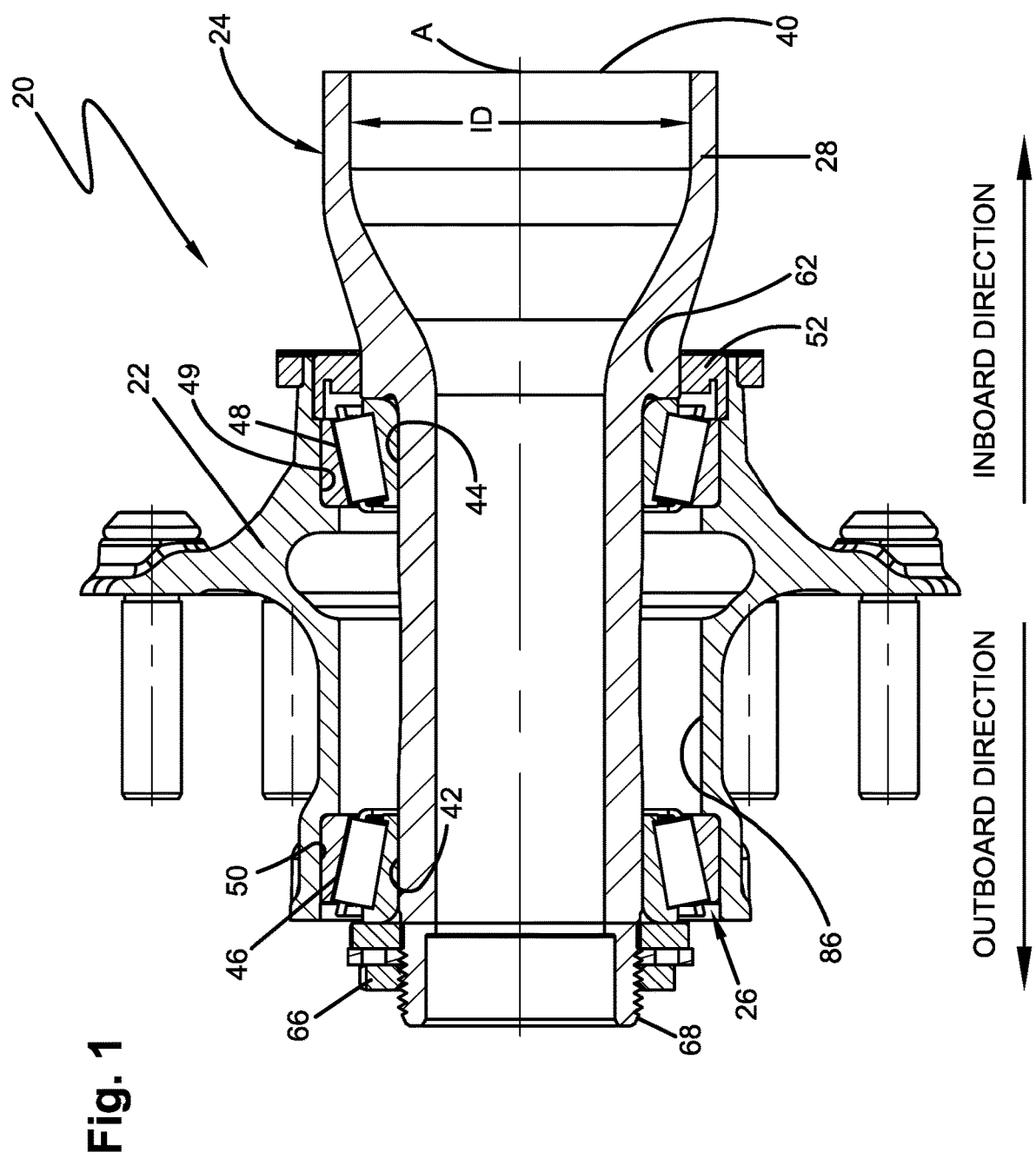
FIG. 1 is a longitudinal cross-sectional view of a wheel end assembly including an axle spindle constructed according to an aspect of the disclosed subject matter.

The disclosed subject matter is described with reference to the drawings, in which like reference characters are used to refer to like elements throughout the description and drawings. For exemplary purposes, details are set forth in order to provide an understanding of the disclosed subject matter. It will be understood that the disclosed subject matter can be practiced and implemented without these specific details.

A wheel end assembly 20 (FIG. 1) is for use with a heavy-duty vehicle (not shown), such as a truck, tractor-trailer or trailer and is operatively connected to an axle central tube (not shown) of an axle assembly, as is known. An improved axle spindle 24, constructed according to an aspect of the disclosed subject matter, is joined to the axle central tube (not shown) as is known. A pair of substantially identical wheel end assemblies 20 are located at respective axial ends of the axle central tube. There may be more than one axle used on the heavy-duty vehicle. For simplicity, only one of the wheel end assemblies 20 will be described in detail but will equally apply to every wheel end assembly used on the heavy-duty vehicle.

The wheel end assembly 20 includes a hub 22 supported for relative rotation on the improved axle spindle 24 by a bearing system 26 comprising a pair set of tapered roller bearings, cups and cones. The improved axle spindle 24 can withstand the strain and stress concentrations associated with use on a heavy-duty vehicle and increase service life of the axle spindle and bearing system 26. The improved axle spindle 24 also has a portion with a relatively low rate of change in section modulus which could increase fatigue life. The improved axle spindle 24 further is relatively light in weight. The improved axle spindle 24 may also enable the development and use of relatively lighter weight bearings.

The axle central tube is hollow or tubular with a substantially round cross-section and has an annular end surface. The axle central tube may be made of any suitable material, such as steel. The axle central tube and the axle spindle 24 could have any cross-sectional shape, size and configuration. The axle spindle 24 is preferably hollow or tubular over its entire length and has a substantially round tubular end portion or skirt 28 with an annular end surface 40. The axle spindle 24 may be made of any suitable material, such as steel. Preferably, the inner and outer diameters of the axle central tube and the skirt 28 of the axle spindle 24 are substantially the same at their respective annular end surfaces. It is contemplated that the inner diameters of the axle and skirt 28 of the axle spindle 24 could be different. For example, the inner diameter ID of the skirt 28 could have a relatively smaller inner diameter than that of the axle central tube.

The annular end surface of the axle central tube and the annular end surface 40 of axle spindle 24 are joined together by any suitable method, such as by friction welding, according to one aspect. It will be appreciated that any suitable means of permanently joining the axle spindle 24 to the axle may be used, for example MIG, TIG, arc, oxyacetylene gas, laser, projection, butt or capacitance welding, and the like.

Figure 2:
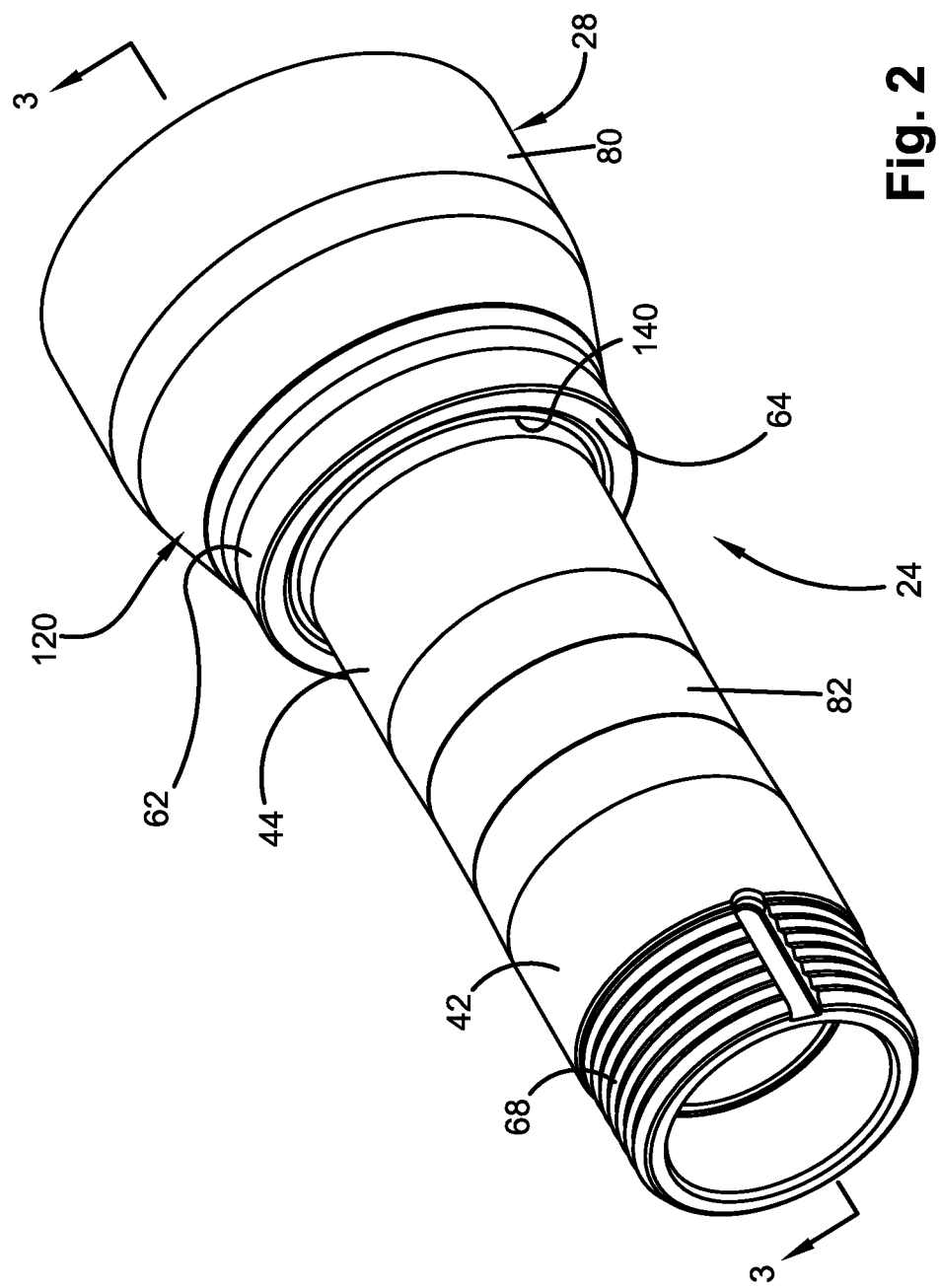
FIG. 2 is an overall perspective view of the axle spindle illustrated in FIG. 1.

The tubular axle spindle 24 for the heavy-duty vehicle has a longitudinal central axis A and is illustrated, for exemplary purposes, as a "straight" or "non-tapered" axle spindle with axially spaced bearing support surfaces 42, 44 (FIGS. 1-3) of the same diameter. The bearing support surfaces 42, 44 are spaced apart and in precise coaxial alignment with one another along the axle spindle 24. It will be appreciated that the axle spindle 24 may also be a "tapered" axle spindle type with bearing support surfaces of different diameters without affecting the overall concept or implementation of the disclosed subject matter.

The bearing system 26 of the wheel end assembly 20 includes a bearing assembly or outboard bearing 46 received on the outboard bearing support surface 42 of the axle spindle 24. The bearing system 26 also includes a bearing assembly or an inboard bearing 48 which is received on the inboard bearing support surface 44 of the axle spindle 24. The bearings 46, 48 are illustrated as tapered roller bearings, but it will be appreciated that any suitable bearing may be employed.

Figure 4:
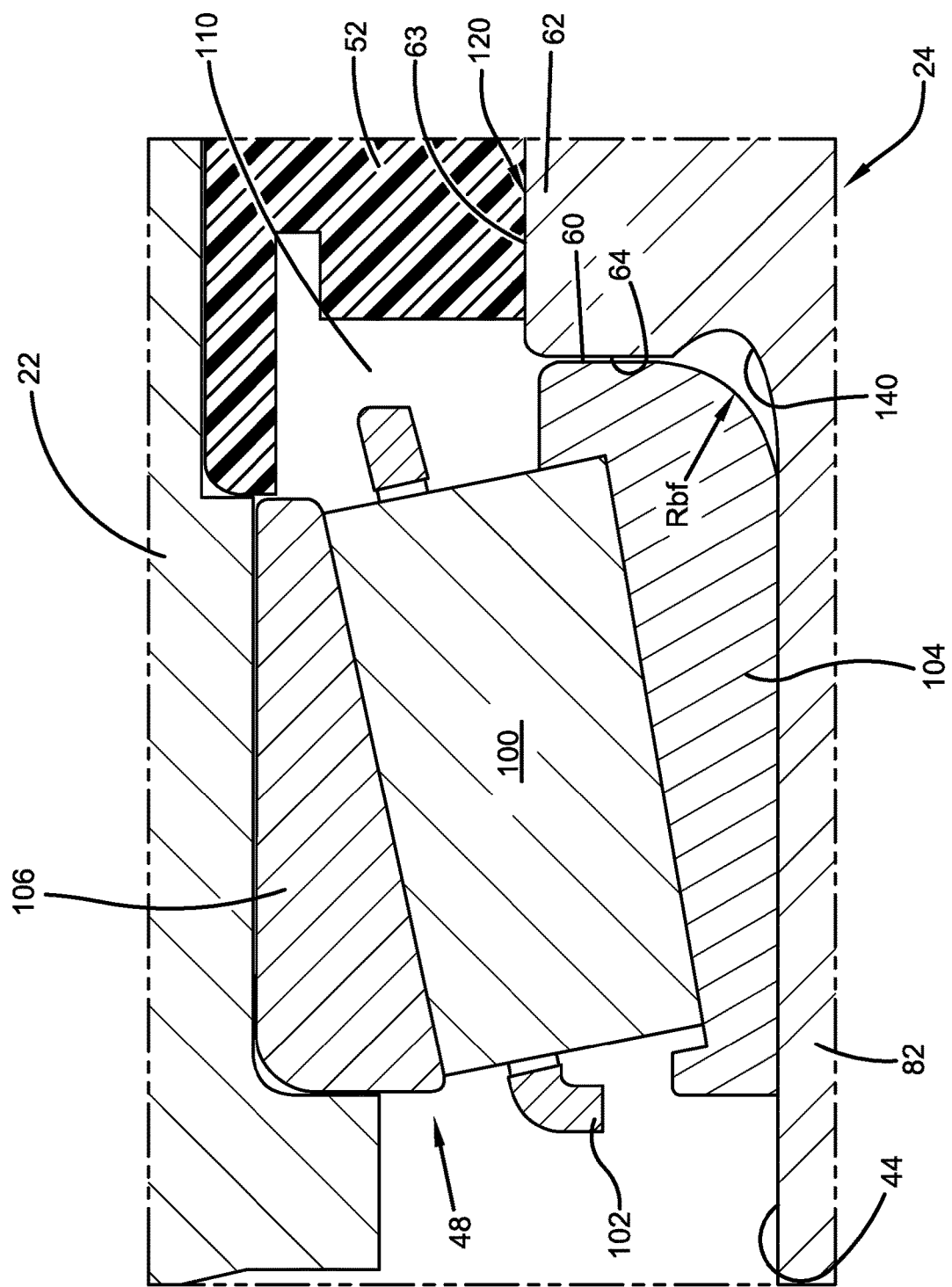
FIG. 4 is an enlarged fragmentary cross-sectional view of a portion of the axle spindle and a bearing system of FIG. 1, illustrating a relationship among a bearing, a shoulder and an annular profile formed in the shoulder.

The inboard bearing 48 is received in a bore 49 in the hub 22. The inboard bearing 48 has an annular inboard side surface 60 (best seen in FIG. 4). The axle spindle 24 has an annular shoulder portion 62 with an annular shoulder surface 64. The side surface 60 of the inboard bearing 48 engages the annular shoulder surface 64 of the annular shoulder portion 62 of the axle spindle 24. Engagement of the side surface 60 of the inboard bearing 48 with the annular shoulder surface 64 establishes the inboard axial or longitudinal position of the inboard bearing on the axle spindle 24 and blocks or prevents any further inboard movement of the inboard bearing.

The outboard bearing 46 is received in a bore 50 in the hub 22. A spindle nut assembly 66 is threaded onto a threaded end portion of the axle spindle 24 and establishes the axial or longitudinal position of the outboard bearing 46 on the axle spindle and blocks or prevents any further outboard movement of the outboard bearing. A cavity 86 is defined by the outboard bearing 46, inboard bearing 48, axle spindle 24, hub 22 and a seal 52. The cavity 86 receives a suitable lubricant for the bearing system 26, such as grease or oil.

Figure 3:
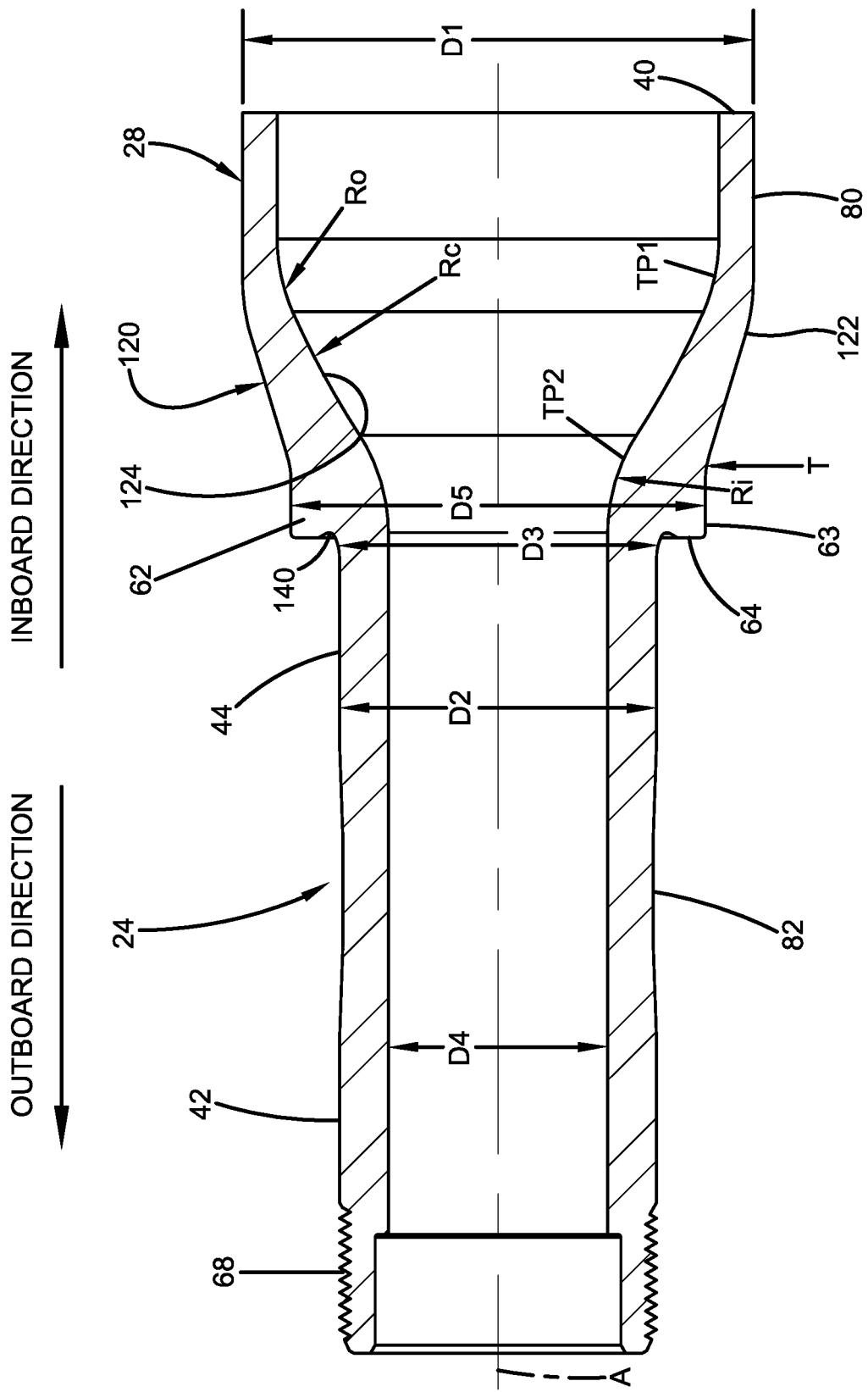
FIG. 3 is an enlarged longitudinal cross-sectional view of the axle spindle illustrated in FIG. 2, taken approximately along line 3-3 in FIG. 2.

The axle spindle 24 has a tubular first cylindrical section 80 (FIGS. 2-3) including the skirt 28. The tubular first cylindrical section 80 extends for a length in a direction along the longitudinal central axis A of the axle spindle 24. The first cylindrical section 80 of the axle spindle 24 is preferably round in cross-section with an outer first diameter D1 (FIG. 3). For example, the outer first diameter D1 could be any suitable diameter for the intended application and load capacity of the heavy-duty vehicle, such as in the range of about 4.90 inches to about 6.00 inches. The annular end surface 40 of the axle spindle 24 abuts the annular end surface of the axle central tube when the axle and the axle spindle are joined together.

The axle spindle 24 has a tubular second cylindrical section 82 that extends in a direction away from the first cylindrical section 80 and is integrally formed with first cylindrical surface by suitable means, such as in a forging process. The second cylindrical section 82 extends coaxially with and is axially spaced from the first cylindrical section 80. The second cylindrical section 82 of the axle spindle 24 includes the bearing support surfaces 42, 44.

The bearing support surfaces 42, 44 receive and support an inner cylindrical surface, such as a bore, of a respective one of the bearings 46, 48 of the bearing system 26. The bearing support surfaces 42, 44 are precision machined to closely fit the inner cylindrical surfaces of the bearings 46, 48. The outer diameters of each of the bearing support surfaces 42, 44 are the same for a straight or non-tapered axle spindle 24, as illustrated and described. The bearing support surfaces 42, 44 of the second cylindrical section 82 have a bearing support diameter or an outer second diameter D2 that is less than the outer first diameter D1 of the first cylindrical section 80. The second diameter D2, for example, is in the range of about 3.4983 inches to about 3.5421 inches, for an axle spindle 24 when the outer first diameter D1 is the range of about 4.90 inches to about 6.00 inches. If the axle spindle 24 is of the tapered type, another cylindrical section would be spaced axially outboard from the inboard bearing support surface 44 and have an outer diameter less than the second outer diameter D2. The second cylindrical section 82 of the axle spindle 24 may have an inner diameter D4 of any suitable dimension, such as in the range of about 2.13 inches to about 2.60 inches, and preferably about 2.45 inches.

The inboard bearing 48 and outboard bearing 46 of the bearing system 26 may be the same in the exemplary aspect. The inboard bearing 48 and outboard bearing 46 may be any suitable bearing type but is preferably of the tapered roller bearing type. For example, the inboard bearing 48 has a plurality of rollers 100 (FIG. 4) retained in a cage 102 between an inner cone 104 having a backface radius Rbf and an outer cup 106. The most inboard end region 110 between the hub 22 and the axle spindle 24 is closed by the seal 52 to prevent lubricant leakage from the cavity 86.

A tubular transition section 120 (FIGS. 2-3) is integrally and coaxially formed with, and extends between the tubular first cylindrical section 80 and the second cylindrical section 82. The tubular transition section 120 tapers in the outboard direction from the relatively larger outer first diameter D1 of the first cylindrical section to the relatively smaller diameter D2 of the second cylindrical section 82. That is, an outer surface 122 of the transition section 120 tapers from the outer first diameter D1 of the first cylindrical section 80 toward the outer second diameter D2 of the second cylindrical section 82. An outboard end portion of the tubular transition section 120 of the axle spindle 24 includes the annular shoulder portion 62.

An axially extending arcuate inner surface 124 of the transition section 120 tapers and blends smoothly from an inner surface of the first cylindrical section 80 at first transition or tangent point TP1 to an inner surface of the second cylindrical section 82 at second transition or tangent point TP2. The arcuate inner surface 124 may be formed with a relatively large radius Rc, taken in a plane containing the longitudinal central axis A. The radius Rc may be in the range of about 8.00 inches to about 12.00 inches, and preferably about 10.00 inches. At least a portion of the inner surface 124 in the transition section 120 may be of any suitable configuration, such as in the form of a spline, curve or straight line. In the illustrated aspect, the inner surface 124 also has an arcuate portion with a radius Ro that smoothly transitions in an outboard direction axially away from the first cylindrical section 80 at tangent point TP1 into the radius Ro. The radius Ro may be in the range of about 1.00 inch to about 3.00 inches, and preferably about 2.00 inches. The inner surface 124 also has an arcuate portion with a radius Ri that smoothly transitions with the radius Rc in an outboard direction axially from first cylindrical section 80 at the tangent point TP2. The radius Ri may be in the range of about 1.00 inch to about 3.00 inches, and preferably about 2.00 inches. The relationship among the radii Rc, Ro and Ri that define the inner surface 124 is that the radius Rc is greater than both radii Ro and Ri. The radius Ro may also be greater than the radius Ri. The start of radius Ri is radially inward at or near the axial location of annular shoulder surface 64 and extends in an inboard direction.

The transition section 120 of the axle spindle 24, thus, has a relatively thin radial wall thickness T taken anywhere along transition section when compared to most known forged axle spindles for heavy-duty vehicles taken at the same axial locations. The relatively thin radial wall thickness T of the transition section 120 results in a considerable weight and material savings of the axle spindle 24. An exemplary weight savings in the range of about 10% to about 18% for the axle spindle 24 with a 5.75-inch outer first diameter D1 for the same gross axle weight rating (GAWR) as a prior art axle spindle is achieved. The axle spindle 24 uses a lesser amount of material and provides cost savings in material and possibly processing for the same gross axle weight rating (GAWR). The axle spindle 24 is designed and manufactured to have a relatively small rate of section modulus change in the axial direction in the annular shoulder portion 62 of the transition section 120 at the same gross axle weight rating (GAWR) compared to previously known axle spindles, as is described below.

The annular shoulder portion 62 is preferably continuous in the circumferential direction and located in an end portion of the transition section 120 adjacent to the second cylindrical section 82. More specifically, the annular shoulder surface 64 forms the end of the shoulder portion 62 of the transition section 120 and from which the second cylindrical section 82 may extend. The annular shoulder portion 62 has a seal journal surface 63 (FIGS. 3-4) on which the seal 52 (FIG. 1) is mounted. The seal journal surface 63 has a very precise outer diameter D5 for the seal 52 to engage and effectively retain lubrication within the cavity 86 of the hub 22. The annular shoulder portion 62 and annular shoulder surface 64 of the axle spindle 24 maintain the axial inboard position of inboard bearing 48 and are subject to the relatively high loads of the heavy-duty vehicle.

Figure 5:
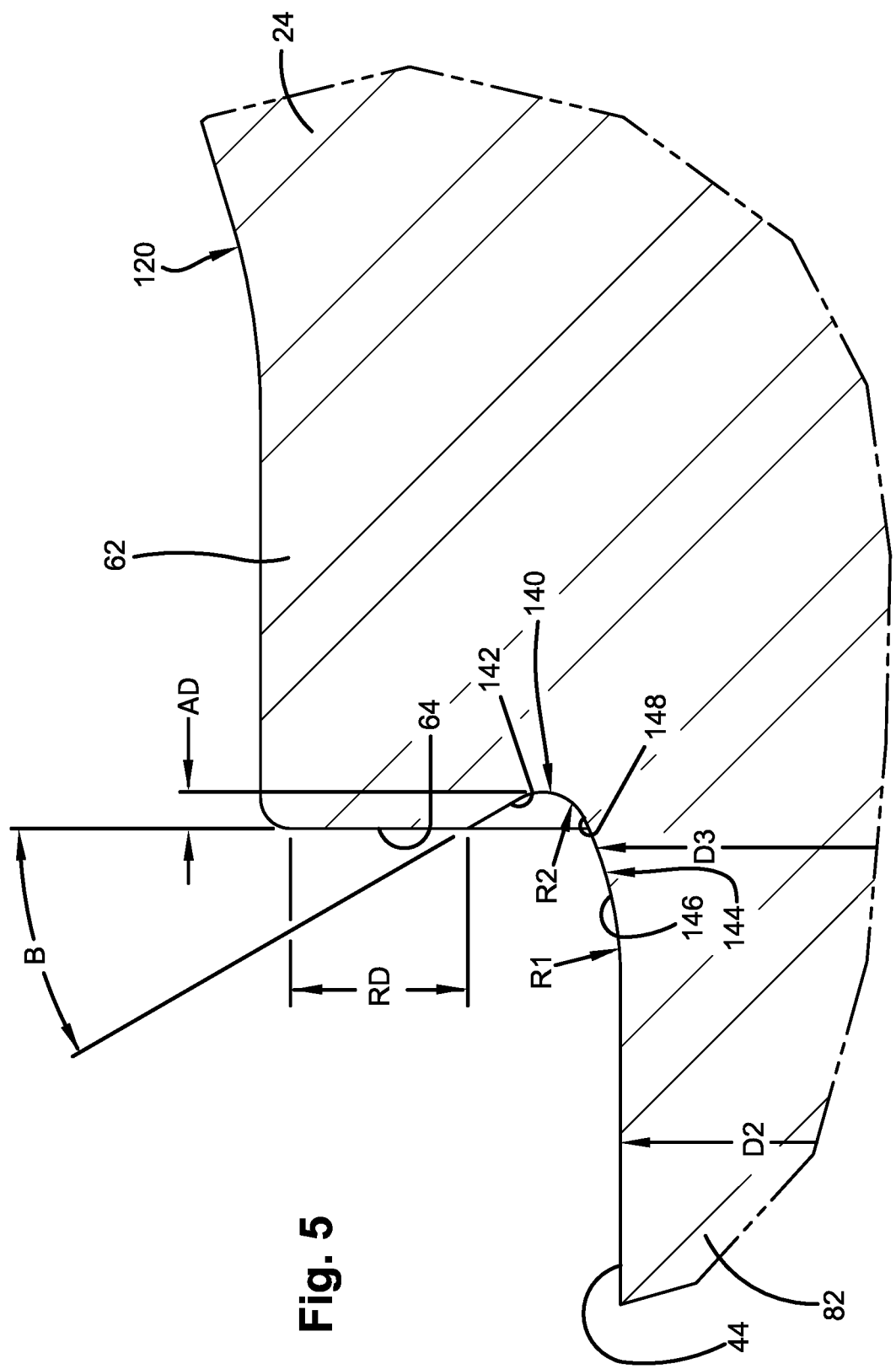
FIG. 5 is an enlarged fragmentary cross-sectional view of a portion of the axle spindle of FIG. 4, illustrating exemplary geometry of the shoulder and annular profile according to one aspect of the disclosed subject matter.

The annular shoulder surface 64 extends in a radial direction from, and substantially perpendicular to, the longitudinal central axis A of the axle spindle 24. The annular shoulder surface 64 is preferably uninterrupted or continuous in the circumferential direction. The annular shoulder surface 64 may contact the annular side surface 60 (FIG. 4) of the inner cone 104 of the inboard bearing 48 over a radial distance RD (FIG. 5). The annular shoulder surface 64 may be hardened by a suitable method to further decrease the occurrence of fretting or galling the annular shoulder surface by axial loads applied by the inboard bearing 48. Such contact establishes an axial position of the inboard bearing 48 of the bearing system 26 on the axle spindle 24 when the spindle nut assembly 66 (FIG. 1) is properly tightened on a threaded end portion 68 (FIGS. 1 and 3) against the outboard bearing 46. Tightening the spindle nut assembly 66 may apply a preload to the bearing system 26 through the hub 22.

The inboard bearing support surface 44, the outboard bearing support surface 42, and the annular shoulder surface 64 may be formed on the axle spindle 24 in the same machining process or operation. The threaded end portion 68 may also be cut or formed on the axle spindle 24 in the same machining process or operation that is used to form the inboard bearing support surface 44, outboard bearing support surface 42 and annular shoulder surface 64.

The axle spindle 24 may have a circumferentially continuous stress relieving annular profile 140 (FIGS. 3-5) according to one aspect. The stress relieving annular profile 140 has a radially extending surface taken in a plane containing the longitudinal central axis of the axle spindle 24. The stress relieving annular profile 140 is located between the inboard bearing support surface 44 of the second cylindrical section 82 and the annular shoulder surface 64 of the annular shoulder portion 62. The annular profile 140 has no portion that extends radially inward of the inboard bearing support surface 44 of the second cylindrical section 82. The entire surface of the annular profile 140 may be defined by a third outer diameter D3 (FIGS. 3 and 5). The third diameter D3 is never less than the outer diameter D2 of the inboard bearing support surface 44 or of a portion of the second cylindrical section 82 adjacent the annular profile 140 at any location along the surface of the annular profile. The annular profile 140 serves to relieve stress concentration in the annular shoulder portion 62 of the axle spindle 24.

The annular profile 140 also may serve as a cavity that additional lubrication for the bearing system 26 can enter and be stored in or that fretted material from the annular shoulder surface 64 can enter in order to keep it out of the bearing system. The annular profile 140 also reduces the weight of the axle spindle 24 somewhat and may require less material to form the axle spindle resulting in a lighter weight axle spindle and less material usage. The annular profile 140 may be machined into axle spindle 24, formed during the forging operation or by other suitable methods of removing material or creating a specific profile. For example, the annular profile 140 may be formed in the same machining process or operation that is used to form inboard bearing support surface 44, outboard bearing support surface 42, annular shoulder surface 64 and threaded end portion 68.

The annular profile 140 provides a void area that does not contact the inboard bearing 48 of the bearing system 26. Even with the annular profile 140, the annular shoulder surface 64 engages the inner cone 104 of the inboard bearing 48 over substantially the same surface area as if no annular profile was present. This is because the backface radius Rbf (FIG. 4) of the inboard bearing 48 is about 0.25 inch on the inner cone 104 in a direction outboard from the side surface 60. The backface radius Rbf establishes an annular or circumferential area that does not contact the annular shoulder surface 64 of an axle spindle whether or not the axle spindle has the stress relieving annular profile 140.

The annular shoulder portion 62 of the axle spindle 24 typically experiences relatively heavy loads and stress, for example, bending stress, Hertzian contact stress and/or axial stress. Bending stress typically increases due to localized stress concentrations from a rapid section area change from quickly varying inner and outer diameters in the transition section 120. The axle spindle 24 of the disclosed subject matter has a relatively small rate of section area change in the axial direction in the annular shoulder portion 62 that results in a relatively low rate of section modulus change. The size and location of the annular profile 140 substantially lowers the peak bending stresses in the annular shoulder portion 62. The resulting decreased total stress level in the annular shoulder portion 62 lowers the potential for fretting and galling of the annular shoulder surface 64 and the side surface 60 of the inner cone 104. The relatively small rate of section modulus changes in the annular shoulder portion 62 may also reduce strain and, thus, localized stress concentrations in the shoulder portion 62 of the axle spindle 24 that may improve fatigue life.

The relatively small rate of section modulus change in axle spindle 24 enables the use of a less robust or thinner shoulder portion 62 and/or transition section 120 with a relatively smaller wall thickness T (FIG. 3), as illustrated by the inner differential wall thickness DWTi and outer differential wall thickness DWTo (FIG. 18) compared to a prior art axle spindle 160. This structure of axle spindle 24 and the annular shoulder portion 62 may allow the use of relatively lighter weight bearings, such as a custom bearing system having a cone with lower backface radius Rbf. The annular profile 140 in the annular shoulder portion 62 of the axle spindle 24 may be of any suitable size and configuration that reduces strain and localized stress concentrations and may be combined with the unique profile of the inner surface 124.

The annular profile 140 may have a radiused segment 144 (FIG. 5) when viewed in a plane containing the longitudinal central axis A. The radiused segment 144 of the annular profile 140 may be of any suitable size and shape. According to an exemplary aspect, the radiused segment 144 of the annular profile 140 may be configured with multiple blended radii with at least two different radii. Any suitable number of blended radii may be used to configure the radiused segment 144 of the annular profile 140. The radiused segment 144 of the annular profile 140 may have any suitable configuration or combination of configurations, such as an arc, spline or curve.

By way of example, the radiused segment 144 of the annular profile 140 may have an annular surface defining a radiused portion 146 located between the annular shoulder surface 64 and the inboard bearing support surface 44 of the second cylindrical section 82. The radiused portion 146 helps transition the inboard bearing support surface 44 of the second cylindrical section 82 in a direction toward the annular shoulder surface 64. The radiused portion 146 has a radius R1. The radius R1 of the radiused portion 146 may be at least about 0.375 inch.

The radiused segment 144 of the annular profile 140 may have another annular surface defining a radiused portion 148 located between the radiused portion 146 and the annular shoulder surface 64 of the shoulder portion 62. The radiused portion 148 smoothly transitions the radiused portion 146 in a direction toward the annular shoulder surface 64. The radiused portion 148 has a radius R2 that is preferably less than the radiused surface R1 of the radiused portion 146. The radius R2 of the radiused portion 148 may be less than about 0.068 inch but preferably no less than about 0.060 inch. There may be some configurations where the radius R2 may be less than 0.060 inch. A ratio of the radius R1 to the radius R2 is preferably in a range from about 5:1 to about 10:1. There is no part of the annular surface of the radiused portion 146 and no part of the annular surface of the radiused portion 148 that extend radially inward of the inboard bearing support surface 44.

The radiused segment 144 of the annular profile 140 may optionally have yet another annular surface defining another radiused portion (not shown) located between the radiused portion 146 and the bearing support surface 44 of the second cylindrical section 82. This other radiused portion would have a radius that is preferably greater than the radius R1 of the radiused portion 146.

By way of example, the annular profile 140 may also have an inclined surface 142 (FIG. 5) or continuously annular frustoconical segment extending radially inward from the annular shoulder surface 64 and blending into the radiused portion 148. The inclined surface 142 has an axially extending depth or distance AD in the range of 0.010 inch to about 0.100 inch. The inclined surface 142 may extend at an acute angle B relative to the annular shoulder surface 64 in the range of about 1° to about 30°. The inclined surface 142 of the annular profile 140 may have any suitable configuration or combination of configurations, such as an arc, spline or curve. It will also be apparent that there could be any number of inclined surfaces or frustoconical segments 142 included in the annular profile 140. It will also be apparent that there could be any number of radiused portions incorporated to define the annular profile 140 that would transition the frustoconical segment 142 into the bearing support surface 44 of the second cylindrical section 82.

Previously known axle assemblies typically incorporate a standard size central tube (not shown) for a heavy-duty vehicle that has an outer diameter of about 5.75 inches. The 5.75 inches standard size axle central tube typically has a wall thickness of about 0.312 inch. It is generally desired to match an outer diameter of an annular end surface of a tubular end portion or skirt of a prior art axle spindle to the outer diameter of the axle central tube to which it is to be fixed. Thus, the prior art axle spindles are relatively thick and heavy and contribute to the overall weight of the heavy-duty vehicle and, therefore, limit the amount of cargo or load that can be carried by the heavy-duty vehicle.

Figure 16:
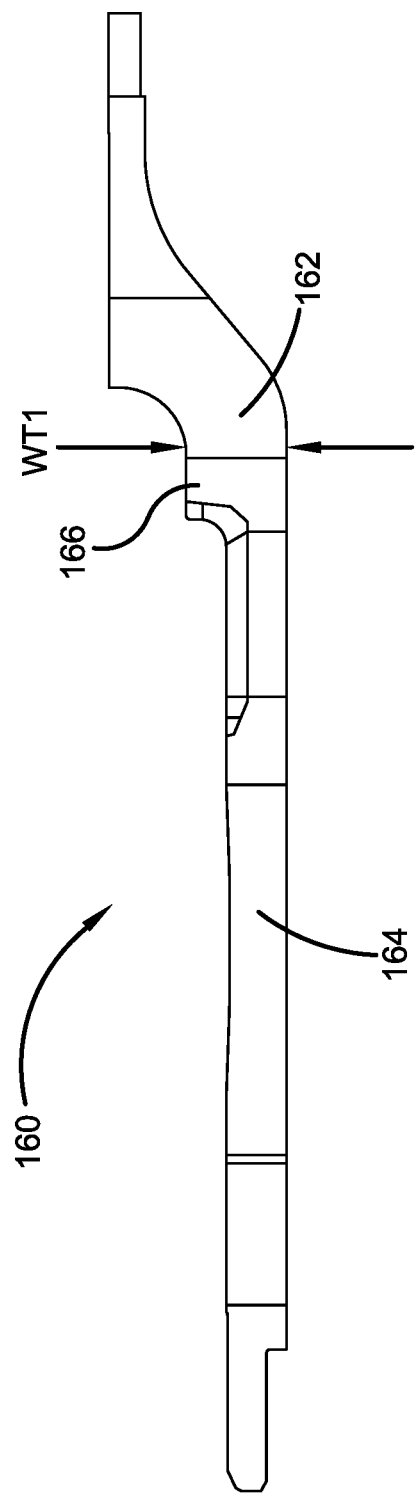
FIG. 16 is a fragmentary cross-sectional view of a portion of a typical prior art axle spindle.

An example of a representative prior art axle spindle is illustrated in FIG. 16. The prior art axle spindle is an HP-310 axle spindle 160 available from Hendrickson Trailer Commercial Vehicle Systems in Canton, Ohio. The prior art axle spindle 160 has a radially extending wall thickness WT1 in a portion of a transition section 162 and shoulder 166.

Figure 17:
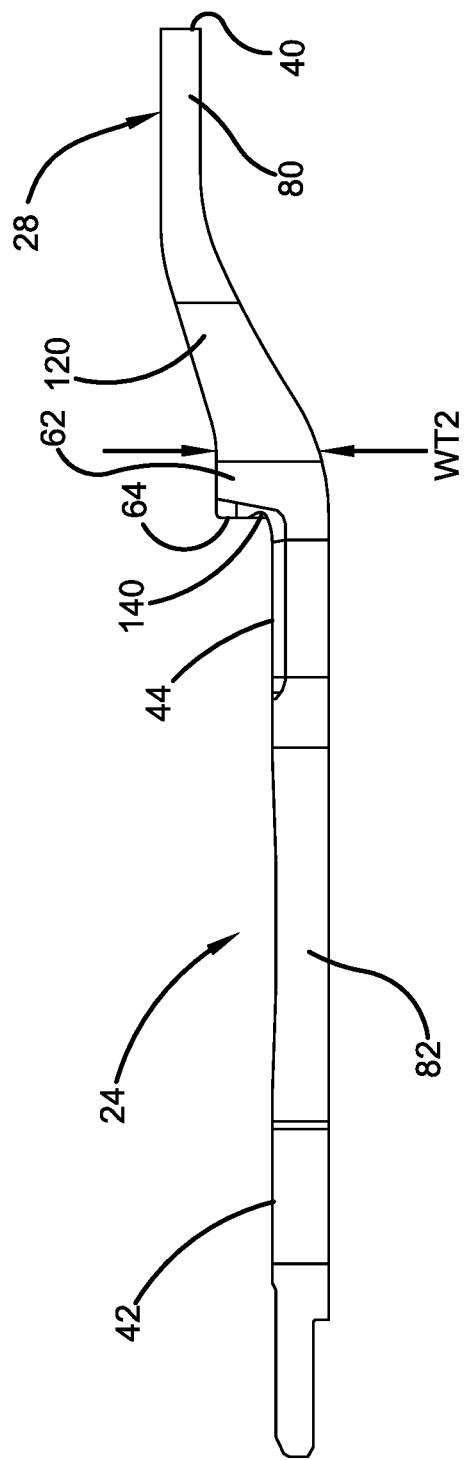
FIG. 17 is a fragmentary cross-sectional view of a portion of the axle spindle constructed according to the disclosed subject matter.

In FIG. 17, the axle spindle 24, constructed according to the disclosed subject matter, has a radially extending wall thickness WT2. The radially extending wall thickness WT2 is taken at the same axial location of a portion of a transition section 120 of the axle spindle 24 as the radially extending wall thickness WT1 of the prior art axle spindle 160 for the same GAWR. It should be apparent that the wall thickness WT1 is noticeably greater than the wall thickness WT2 over most, if not all, of the same axial locations from the annual shoulder surface 64 of the annular shoulder portion 62 in a direction toward the annular end surface 40 of the skirt 28.

Figure 18:
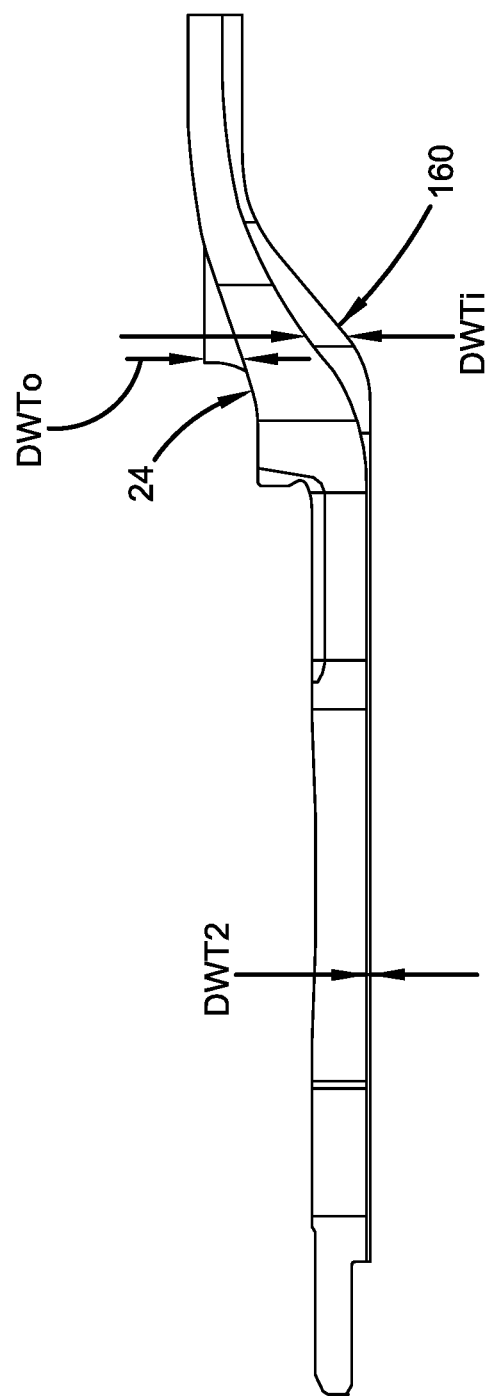
FIG. 18 is a cross-sectional view of the axle spindle of the subject disclosure illustrated in FIG. 17 overlaid onto the prior art axle spindle illustrated in FIG. 16 demonstrating the differences in thicknesses in portions of the respective axle spindles.

FIG. 18 illustrates the longitudinal cross-section of the axle spindle 24 of FIG. 17 overlaid on the longitudinal cross-section of the representative prior art axle spindle 160 of FIG. 16. FIG. 18 illustrates the relatively thinner wall thickness WT2 of the axle spindle 24, as illustrated by the indication of a differential inner wall thickness DWTi and a differential outer wall thickness DWTo. The majority of the differential wall thicknesses DWTi, DWTo are in the transition section 120 (FIG. 17) and the first cylindrical section 80 of the axle spindle 24. The differential wall thickness DWT2 of the axle spindle 24 in the second cylindrical section 82 is also thinner than the prior art axle spindle 160 to a lesser amount than the differential wall thicknesses DWTi, DWTo but over a relatively longer axial extent.

A total weight reduction in the range of approximately 10% to approximately 18% is realized over the prior art axle spindle 160 with the improved axle spindle 24 having similar outer diameters and gross axle weight ratings (GAWRs). This total weight reduction is made possible by the annular profile 140 and the configuration of the inner surface 124 of that axle spindle 24 and how they lower stress concentrations in the transition section 120 and first cylindrical section 80. This weight savings reduces the overall weight of a heavy-duty vehicle and, therefore, allows more cargo to be carried in the heavy-duty vehicle.

Another aspect of the subject disclosure is a method of manufacturing the axle spindle 24 for a heavy-duty vehicle wheel end assembly 20. By way of example, the method includes the step of providing a hollow tubular member or cup-shaped preform to serve as a blank or initial workpiece. The first cylindrical section 80 is formed, preferably by a forging operation, on the tubular member to have a portion with the outer first diameter D1. The second cylindrical section 82 is formed, preferably by a forging operation, integrally in one-piece and coaxially with, and spaced from, the first cylindrical section 80. The second cylindrical section 82 has the second outer diameter D2 that is less than the outer first diameter D1. The tubular transition section 120 is formed, preferably by a forging operation, integrally and coaxially between the first cylindrical section 80 and the second cylindrical section 82. The tubular transition section 120 tapers radially inwardly in an outboard direction on both of the inner and outer surfaces 124, 122.

The annular shoulder portion 62 is formed at an outboard end portion of the tubular transition section 120, preferably by a forging operation, integrally and coaxially between the first cylindrical section 80 and the section 82. The annular shoulder surface 64 is rough formed during the forging operation and then final machined or ground at the outboard end of the annular shoulder portion 62 adjacent the second cylindrical section 82. The annular profile 140 is formed between the second cylindrical section 82 and the annular shoulder surface 64 of the annular shoulder portion 62. The step of forming the annular profile 140 may be done by a machining operation. The bearing support surfaces 42, 44 may be machined on the second cylindrical section 82 of the axle spindle 24.

The method may further include the step of forming the inner and outer surfaces 124, 122 of the tubular transition section 120 to desired profiles. The desired profiles provide at least a portion of the annular shoulder portion 62 and tubular transition section 120 with the relatively small rate of change of section modulus.

Figure 6:
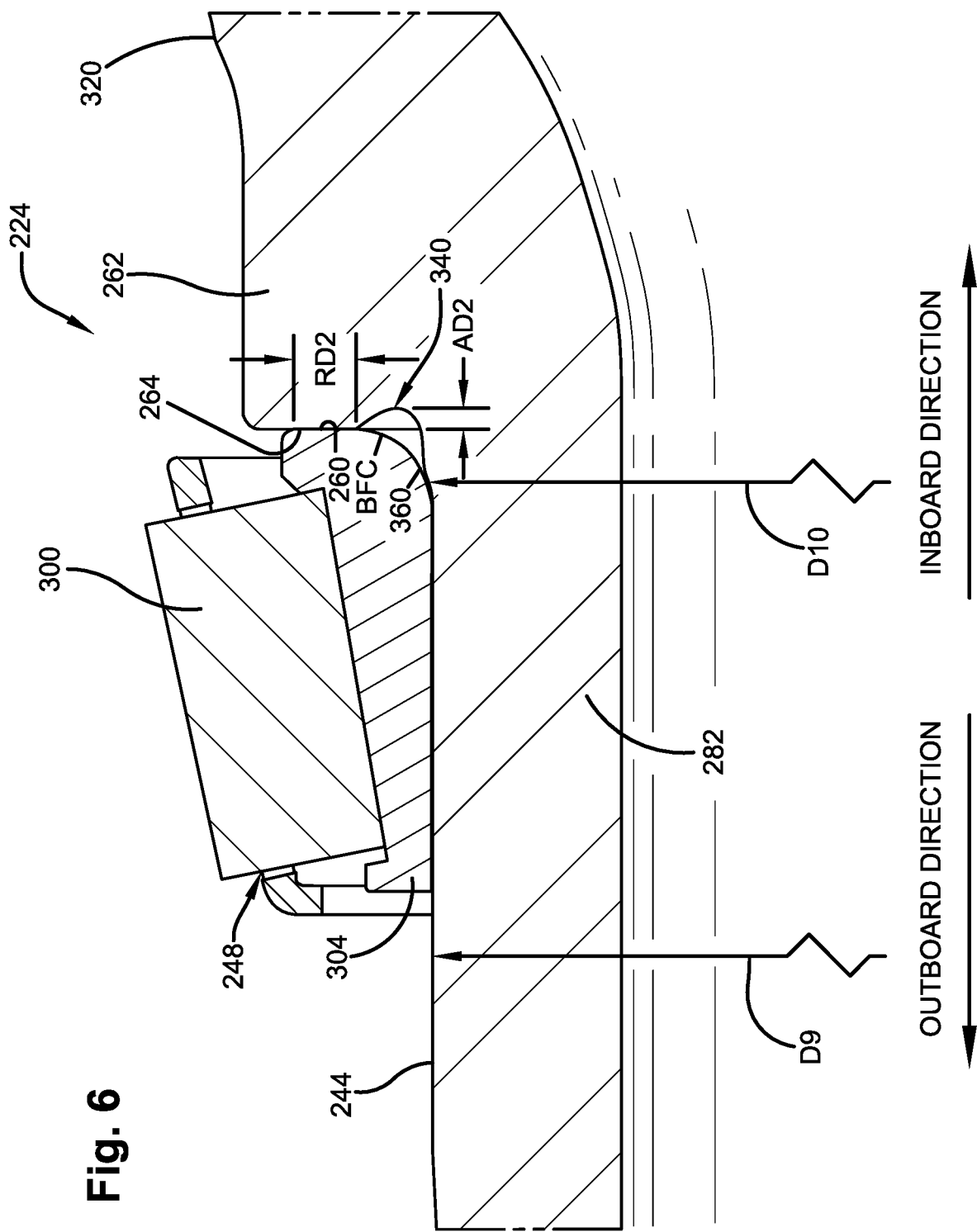
FIG. 6 is an enlarged fragmentary cross-sectional view of a portion of the axle spindle and a bearing system, similar to FIG. 4, according to another aspect of the disclosed subject matter.
Figure 7:
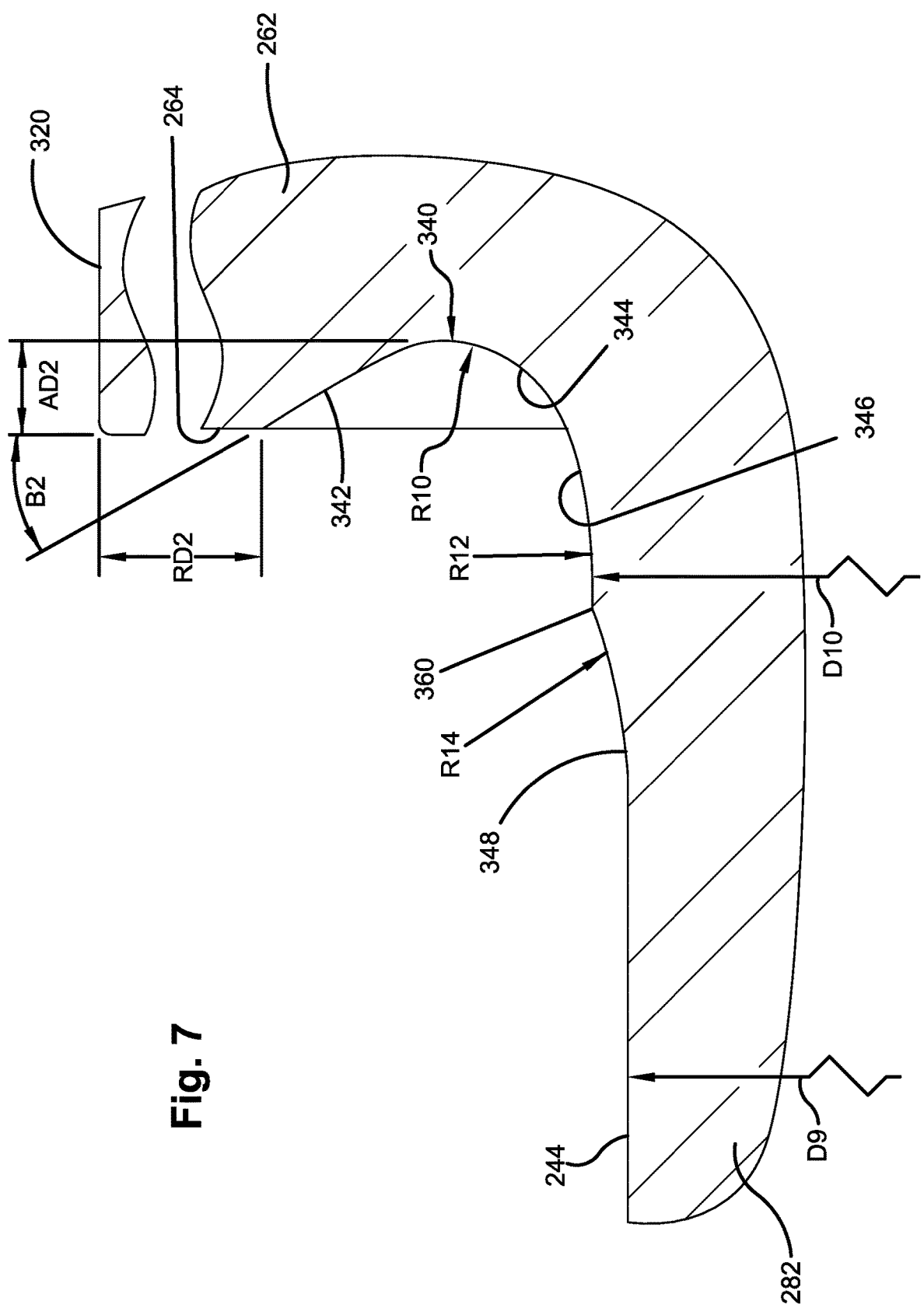
FIG. 7 is an enlarged fragmentary cross-sectional view of a portion of the axle spindle of FIG. 6, illustrating alternate geometry of the shoulder and annular profile forming a cusp.
Figure 8:
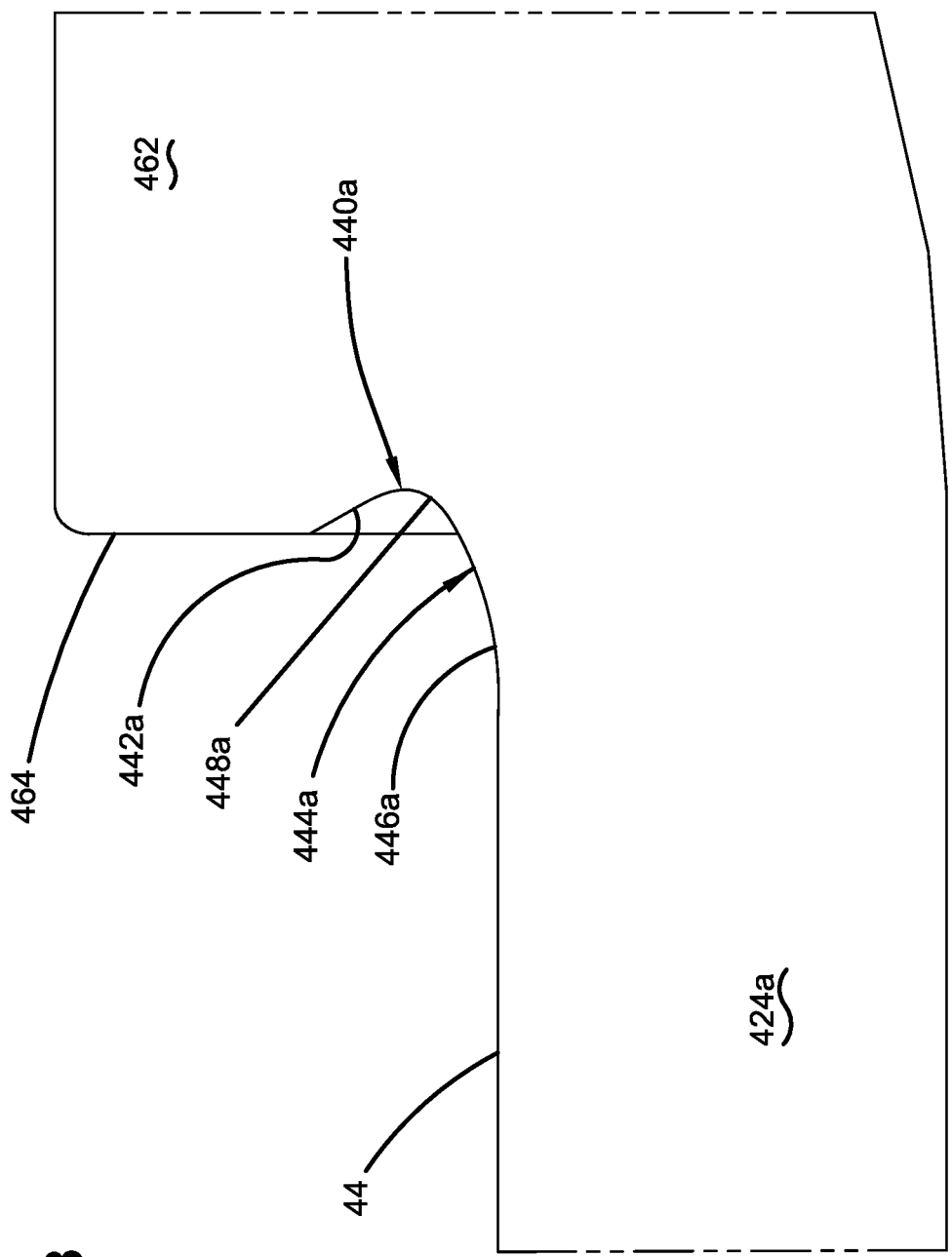
FIGS. 8-11 are enlarged fragmentary cross-sectional views of exemplary alternate geometries of the shoulder and annular profile on a portion of the axle spindle.
Figure 9:
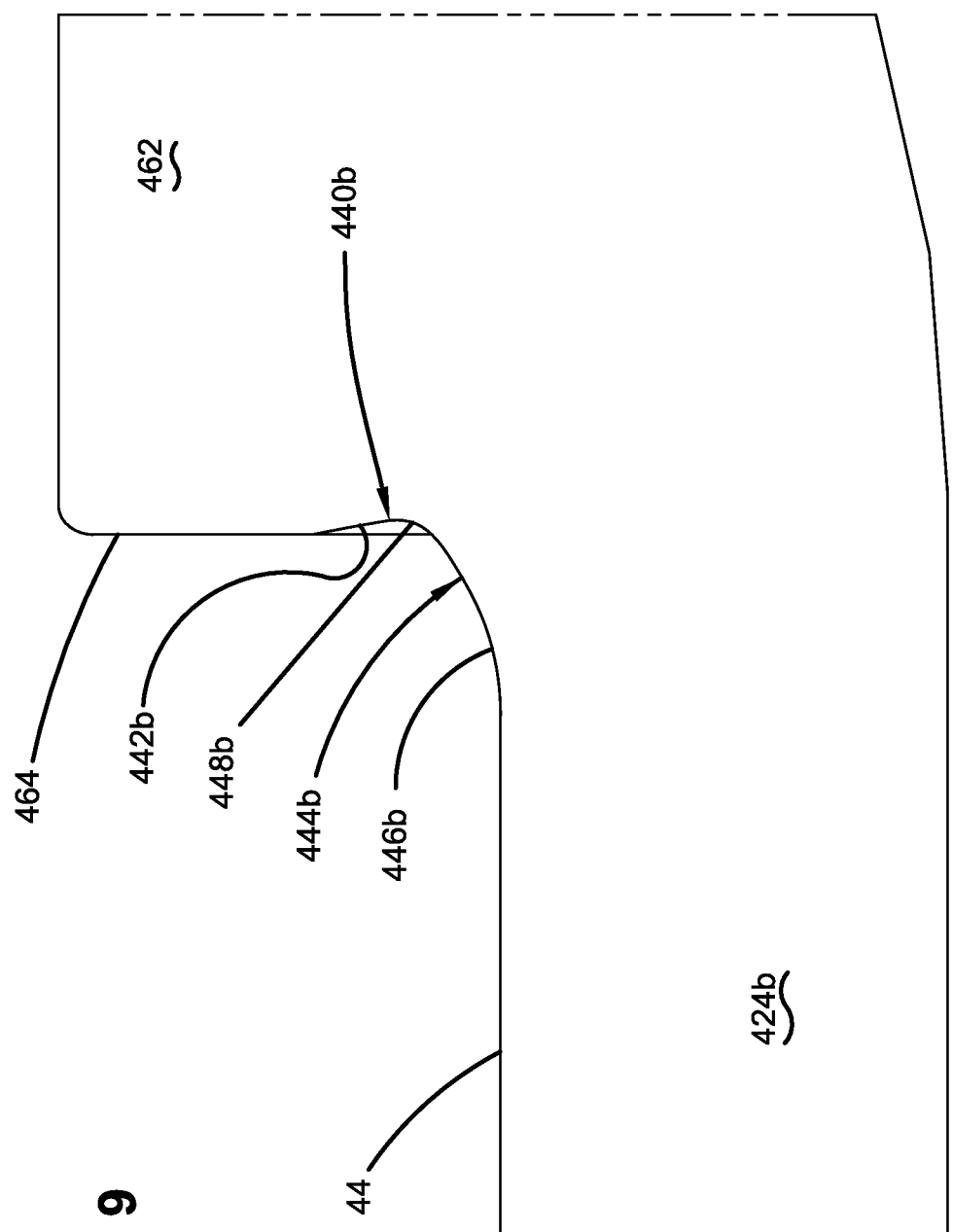
Figure 10:
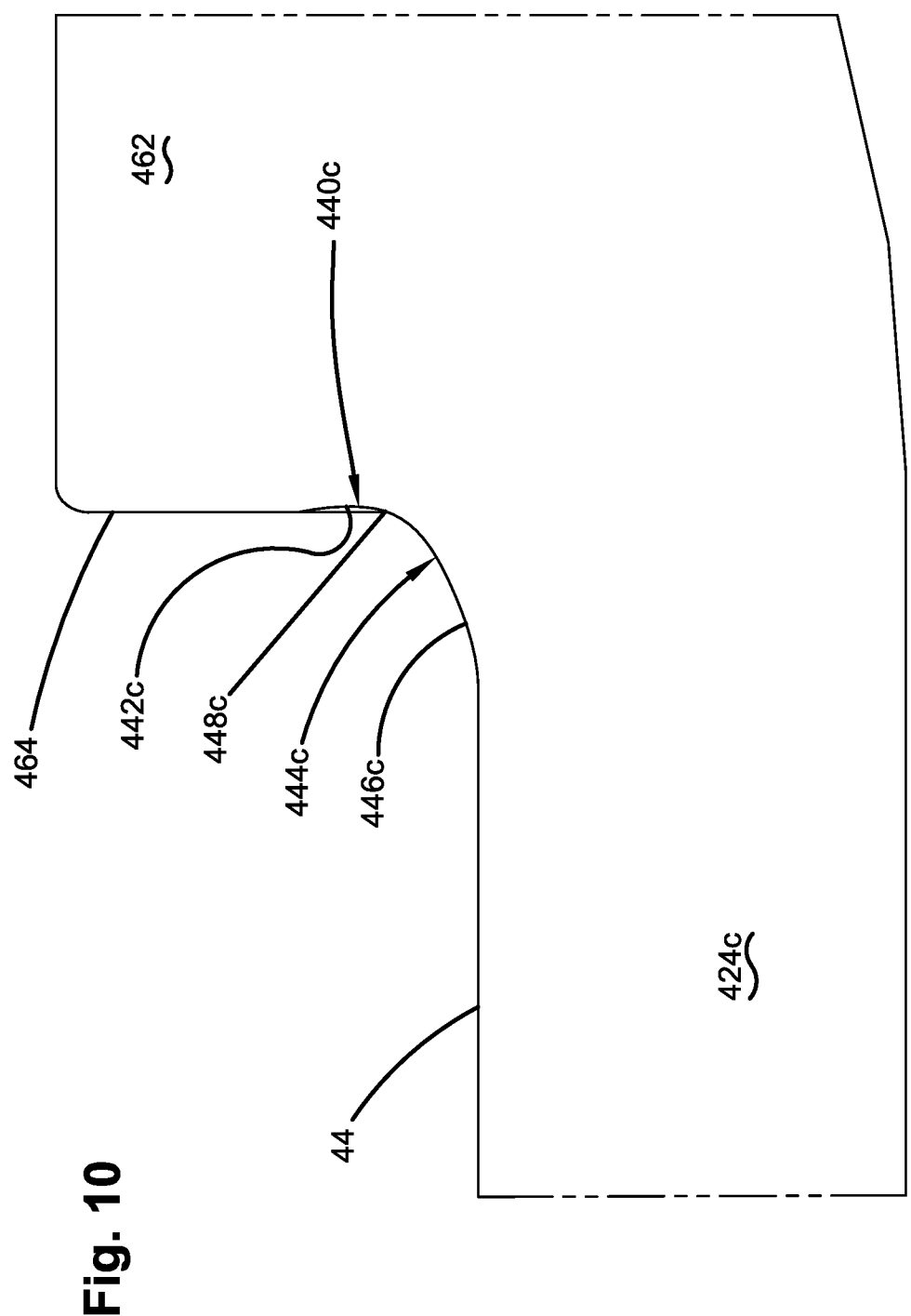
Figure 11:
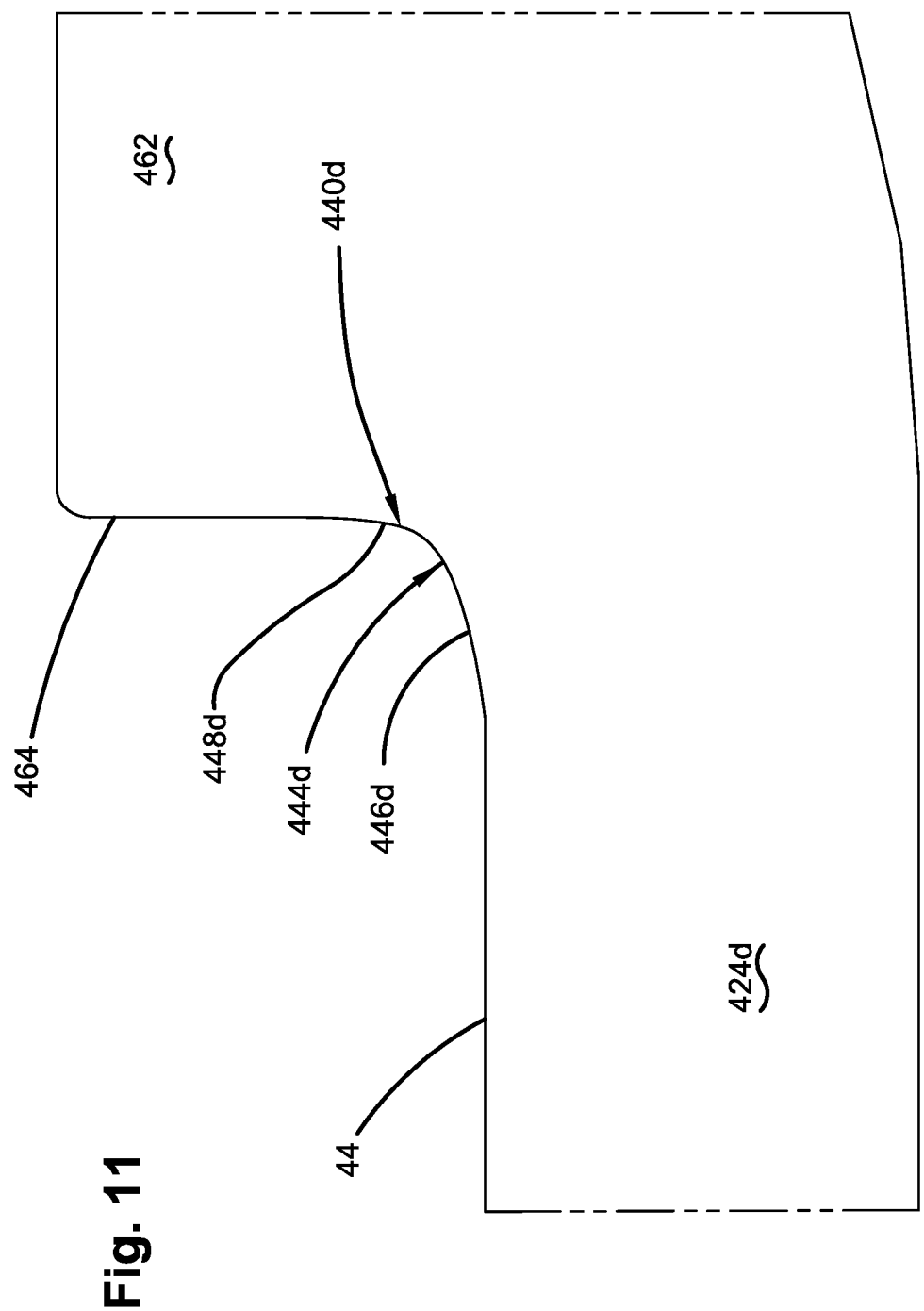

An axle spindle 224 for a heavy-duty vehicle according to another aspect is illustrated in FIGS. 6-7 and includes an alternate stress relieving annular profile 340. The annular profile 340 of axle spindle 224 has a different geometry than the annular profile 140 of the axle spindle 24 illustrated in FIGS. 4-5. All other functions, portions and dimensions of the axle spindle 224 are substantially the same as those of the axle spindle 24.

The axle spindle 224 is preferably a straight or non-tapered type of axle spindle. That is, the axle spindle 224 has a cylindrical section 282 that includes an inboard bearing support surface 244 with an outer diameter D9. The axle spindle 224 may include an inboard bearing 248 (only a portion of which is shown in FIG. 6) that is received on the inboard bearing support surface 244. The bearing 248 has an inboard facing annular side surface 260. The axle spindle 224 has an annular shoulder portion 262 with an annular shoulder surface 264. The annular side surface 260 of the bearing 248 engages the outboard facing annular shoulder surface 264 of the annular shoulder portion 262 of the axle spindle 224. Engagement of the annular side surface 260 of the bearing 248 with the annular shoulder surface 264 establishes the axial or longitudinal position of the bearing 248 on the axle spindle 224 and prevents any further movement of the bearing in the inboard direction. The annular shoulder portion 262 may be hardened by any suitable method, such as heat treating.

The annular shoulder surface 264 extends in a radial direction from, and substantially perpendicular to, the longitudinal central axis (not shown) of the axle spindle 224. The annular shoulder surface 264 is preferably uninterrupted or continuous circumferentially. The annular shoulder surface 264 contacts the annular side surface 260 of the inner cone 304 of the bearing 248 over a radial distance RD2.

The axle spindle 224 has a tubular transition section 320 (FIG. 6) that tapers radially outward from the shoulder portion 262 as it progresses axially inboard. The axle spindle 224 has a relatively thin radial wall thickness along the transition section 320 (similar to axle spindle 24 and transition section 120) when compared to most known forged axle spindles 160 (FIG. 16) for heavy-duty vehicles at the same axial location along the axle spindle and at the same GAWR. The relatively thin radial wall thickness results in a considerable weight savings of the axle spindle 224 when compared to previously known axle spindles 160 for a heavy-duty vehicle. The axle spindle 224, thus, may also use a lesser amount of material to withstand the loads it will be subject to for cost savings in material. The annular shoulder portion 262 and/or transition section 320 have at least a portion formed to have a relatively smooth and/or small rate of section modulus change as it extends axially inboard from the annular shoulder surface 264. The relatively smooth and/or small rate of section modulus change reduces localized stress concentrations and smoothly distributes stress to maintain or improve fatigue life, as described below.

The stress relieving annular profile 340 (FIGS. 6-7) is preferably circumferentially continuous and located between the inboard bearing support surface 244 of the cylindrical section 282 and the annular shoulder surface 264 of the shoulder portion 262. The annular profile 340 helps reduce strain and localized stress concentrations in the annular shoulder portion 262 of the axle spindle 224. No part of the annular profile 340 extends radially inward of the inboard bearing support surface 244 of the cylindrical section 282. The annular profile 340 is defined by a surface profile with a diameter D10 that is located entirely radially outward of the inboard bearing support surface 244. The diameter D10 defining the annular profile 340 varies over its axial extent. The diameter D10 of the annular profile 340 is never less than the outer diameter D9 of the inboard bearing support surface 244 at any axial location. The annular profile 340 can be formed in the same machining process or pass that is used to form inboard bearing support surface 244, outboard bearing support surface and/or annular shoulder surface 264.

The radially extending distance, dimension or length RD2 of the annular shoulder surface 264 may be any suitable length and may depend on a particular application in which the axle spindle 224 will be used and what bearing may be employed. The annular profile 340 provides a void area that does not contact the annular side surface 260 of the bearing 248. Even with the annular profile 340, the annular shoulder surface 264 engages the inner cone 304 of the bearing 248 over substantially the same surface area as if no annular profile was present. This is because a backface clearance corner BFC (FIG. 6) on the inner cone 304 of the bearing 248 establishes a radially extending annular region that does not contact annular shoulder surface 264 of an axle spindle 224 whether or not the axle spindle has the annular profile 340.

The annular profile 340 may be of any suitable size and configuration that reduces strain and stress concentrations in the annular shoulder portion 262 of the axle spindle 224. By way of example, the annular profile 340 may have a continuous annular frustoconical segment or inclined surface 342 (FIG. 7) extending radially inward from the annular shoulder surface 264. In the exemplary configuration illustrated in FIG. 7, the frustoconical segment of inclined surface 342 may have an inboard axially extending depth or distance AD2 from the annular shoulder surface 264 in the range from about 0.010 inch to about 0.100 inch and preferably in the range from about 0.040 inch to about 0.070 inch. The frustoconical segment of inclined surface 342 may extend at an acute angle B2 relative to the annular shoulder surface 264 in the range from about 1° to about 30°. The inclined surface 342 of the annular profile 340 may have any suitable configuration or combination of configurations, including an arc, spline or curve.

The annular profile 340 may also have an axially extending continuous radiused segment with a radiused annular surface 344 extending radially inward of, and from, the frustoconical segment of inclined surface 342. The radiused annular surface 344 of the annular profile 340 is located between the frustoconical segment of inclined surface 342 and the inboard bearing support surface 244 of the cylindrical section 282. The radiused annular surface 344 forms part of the bottom or radially inward portion, as viewed in FIG. 7, of the annular profile 340 and smoothly blends or transitions the inclined surface 342 in a direction toward the bearing support surface 244 of the cylindrical section 282. The radiused annular surface 344 has no portion with a smaller diameter than the diameter of the inboard bearing support surface 244 of the cylindrical section 282.

The radiused annular surface 344 of the annular profile 340 may be of any suitable size and shape that contributes to the reduction of strain and stress concentrations in the annular shoulder portion 262 of the axle spindle 224. The radiused annular surface 344 of the annular profile 340 has a radius R10. According to an exemplary aspect, the radiused annular surface 344 of the annular profile 340 may be configured with multiple or blended radii. Any suitable number of blended radii may be used to configure the radiused annular surface 344 of the annular profile 340. The radiused annular surface 344 of the annular profile 340 may have any suitable configuration or combination of configurations, such as an arc, spline or curve.

The annular profile 340 may have another annular surface 346 located between the radiused annular surface 344 and the inboard bearing support surface 244 of the cylindrical section 282. The annular surface 346 may be of any suitable size and shape that contributes to the reduction of strain and stress concentrations in the annular shoulder portion 262 of the axle spindle 224. The annular surface 346 smoothly transitions the radiused annular surface 344 in a direction toward the inboard bearing support surface 244 of the cylindrical section 282 with a relatively larger radius R12 than the radius R10 of radiused annular surface 344. For example, the annular surface 346 may have a radius R12 that preferably may be larger than the radius R10 of radiused annular surface 344. The radius R10 may be in the range of about 0.050 inch to about 0.075 inch, and preferably about 0.068 inch. The radius R12 may be in the range of about 0.500 inch to about 0.750 inch, and preferably about 0.557 inch. A ratio of the radius R12 of the annular surface 346 to the radius R10 of the radiused annular surface 344 is preferably in a range from about 5:1 to about 10:1. No part of the annular surface 346 and no part of the radiused annular surface 344 extend radially inward of the inboard bearing support surface 244.

The annular profile 340 may have yet another radiused annular surface 348 located between the radiused annular surface 346 and the bearing support surface 244 of the cylindrical section 282. The annular surface 348 transitions the annular surface 346 in a direction toward, and into, the bearing support surface 244 of the cylindrical section 282. The annular surface 348 has a radius R14. The radius R14 may be in the range of about 0.150 inch to about 0.500 inch, and preferably about 0.250 inch.

A peak or cusp 360 (FIG. 7) is formed between the annular surface 346 and the annular surface 348. The cusp 360 may be a radially outward extending discontinuity between the annular surface 346 and the annular surface 348. The cusp 360 represents a region where the annular surfaces defining the annular profile 340 do not blend smoothly into one another. The backface clearance corner BFC on the inner cone 304 may be of any suitable size and configuration, such as a chamfer or radius, as long as it avoids contact with the cusp 360 of the axle spindle 224, as illustrated in FIG. 6.

The annular shoulder portion 262 of the axle spindle 224 typically experiences relatively heavy loads and stress, for example, bending stress, Hertzian contact stress and/or axial stress. Bending stress typically increases due to stress concentration from a rapid section change of diameters. The annular profile 340 substantially lowers, or substantially removes, the peak bending stresses caused by the stress concentration in the annular shoulder portion 262. The resulting decreased total stress level in the annular shoulder portion 262 lowers the potential for fretting and galling of the annular shoulder surface 264 and the annular side surface 260 of the inner cone 304. The axle spindle 224 has a relatively small rate of section modulus change in the axial direction in the annular shoulder portion 262. The relatively smooth and/or small rate of section modulus change helps reduce localized stress concentrations and smoothly distributes stress to maintain or improve fatigue life. The decreased total stress level in the annular shoulder portion 262 may also enable the use of at least a thinner transition section 320.

Alternate geometry configurations of the annular profiles 140 and 340 are illustrated in FIGS. 8-11. These are a few of the alternate geometry configurations for the annular profiles 140 and 340 that may be used. To avoid confusion and for simplicity of the description for what is illustrated in FIGS. 8-11, reference characters 424a-d will be used to refer to aspects of both axle spindles 24 and 224 described above. Likewise, reference characters 440a-d will be used to refer to aspects of both annular profiles 140 and 340 described above. The corner shape or annular profile 440a-d of axle spindle 424a-d may be formed with any suitable configuration. For example, and without limitation, the corner shape or annular profile 440a-d of axle spindle 424a-d may be selected from any of the configurations illustrated in FIGS. 8-11 and more configurations that are not shown. These illustrated configurations are but a few of the possible configurations for the corner shape or annular profile 440a-d. Also, the reference characters 462 will be used to refer to both aspects of annular shoulder portions 62, 262 described above. All other types, portions and dimensions of the axle spindle 424a-d are substantially the same as or identical to corresponding portions and dimensions of the axle spindles 24 and 224 illustrated and described above.

By way of example, the axle spindle 424a-d is preferably a straight or non-tapered type of axle spindle with the same bearing support surface 44. The axle spindle 424a-d has the annular shoulder portion 462 with an annular shoulder surface 464 that is common to the alternate geometry configurations illustrated in FIGS. 8-11.

The annular shoulder surface 464 forms the end of the annular shoulder portion 462 and the beginning of the bearing support surface 44. The annular shoulder surface 464 is preferably circumferentially uninterrupted or continuous. The annular shoulder surface 464 extends in a radial direction from, and substantially perpendicular to, a longitudinal central axis (not shown) of the axle spindle 424a-d.

The annular profile 440a-d (FIGS. 8-11) is preferably circumferentially continuous and is located in the annular shoulder portion 462 between the bearing support surface 44 and the annular shoulder surface 464. The annular profile 440a-d has no portion with a diameter that is less than the outer diameter of the bearing support surface 44. The annular profile 440a-d is entirely located radially outward of the bearing support surface 44 and serves to reduce stress concentrations in the annular shoulder portion 462.

The size and location of the annular profile 440a-d substantially lowers the peak bending stresses in the annular shoulder portion 462. The resulting decreased total stress level in the annular shoulder portion 462 lowers the potential for fretting and galling of the annular shoulder surface 464 of the annular shoulder portion 462. The relatively small rate of section modulus changes in the annular shoulder portion 462 may also reduce strain and, thus, stress concentrations in the shoulder portion 462. This relatively small rate of section modulus change enables the use of a less robust or thinner shoulder portion 462 compared to a prior art axle spindle. This structure of axle spindle 424a-d and the annular shoulder portion 462 may allow the use of relatively lighter weight bearings. The annular profile 440a-d may be of any suitable size and configuration that reduces strain and stress concentrations, as well as providing a relatively small rate of section modulus change, in the annular shoulder portion 462.

Specifically, a radiused surface 444a (FIG. 8) of the annular profile 440a may be of any suitable size and shape that reduces strain and stress concentrations in the annular shoulder portion 462 of the axle spindle 424a. According to an exemplary aspect, the radiused surface 444a of the annular profile 440a may be configured with multiple blended radii of at least two different radii. Any suitable number of blended radii may be used to configure the radiused surface 444a of the annular profile 440a. The radiused surface 444a of the annular profile 440a may have any suitable configuration or combination of configurations, such as an arc, spline or curve.

Figure 12:
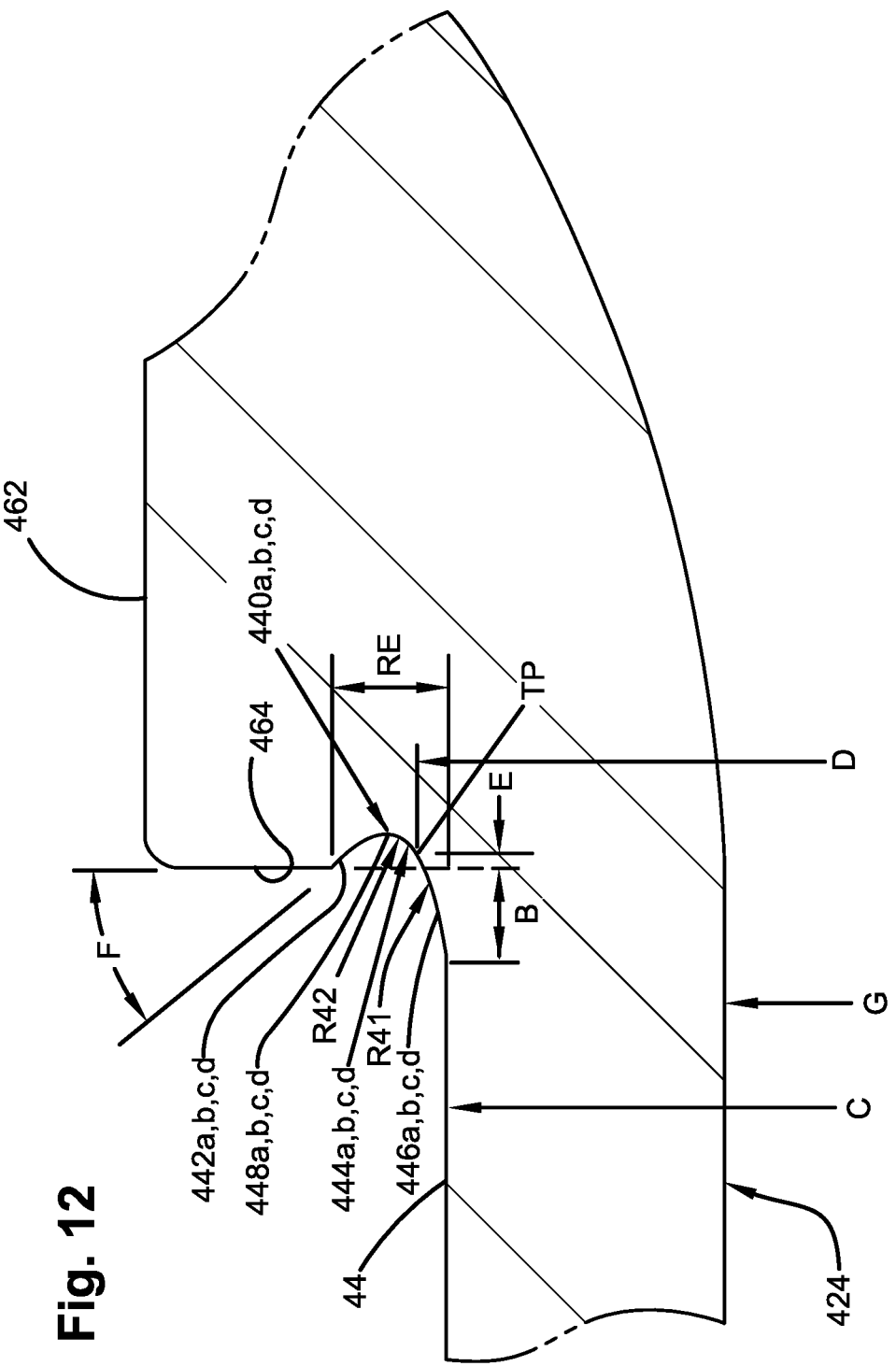
FIG. 12 is an enlarged fragmentary cross-sectional view of a portion of the axle spindle in FIGS. 8-11 with representative geometries of the shoulder and annular profile.

By way of example, the radiused surface 444a of the annular profile 440a may have an annular surface defining a radiused portion 446a located between the annular shoulder surface 464 and the inboard bearing support surface 44. The radiused portion 446a helps transition the inboard bearing support surface 44 in a direction toward the annular shoulder surface 464. The radiused portion 446a has a radius R41 (FIG. 12). The radius R41 of the first radiused portion 446a may be at least about 0.375 inch. For the illustration purposes in FIG. 12, the reference character suffixes will be dropped for clarity as they apply to each of the configurations illustrated in FIGS. 8-11.

The radiused surface 444a of the annular profile 440a may have another annular surface defining a radiused portion 448a located between the radiused portion 446a and the annular shoulder surface 464 of the shoulder portion 462. The radiused portion 448a transitions the radiused portion 446a in a direction toward the annular shoulder surface 464. The radiused portion 448a has a radius R42 that is preferably less than the radius R41 of the first radiused portion 446a. The radius R42 of the radiused portion 448 may be about 0.068 inch but no less than about 0.060 inch. A ratio of the first radius R41 to the second radius R42 is preferably in a range from about 5:1 to about 10:1. No part of the surface of the radiused portion 446a and no part of the surface of the radiused portion 448a have a diameter that is less than the diameter of the inboard bearing support surface 44.

The annular profile 440a may have an inclined surface or continuously annular frustoconical segment 442a (FIGS. 8 and 12) extending radially inward from the annular shoulder surface 464 and blend into the radiused surface 444a. The frustoconical segment 442a may extend at an acute angle F relative to the annular shoulder surface 464 of about 30°.

The radiused surface 444a of the annular profile 440a is located between the frustoconical segment 442a and the bearing support surface 44. The radiused surface 444a forms the bottom or radially inward portion, as viewed in FIGS. 8 and 12, of the annular profile 440a and transitions the frustoconical segment 442a into the bearing support surface 44. The radiused surface 444a and frustoconical segment 442a, in any configuration, have no portion with a diameter that is less than the diameter of the inboard bearing support surface 44.

Other important dimensions and relationships for the axle spindle 424a (FIG. 12 without the letter suffixes) are further described. For example, the axle spindle 424a has a radial extent or distance RE from the bearing support surface 44 to the radially outward start of the annular profile 440a. For axle spindle 424a the distance RE is about 0.231 inch but no greater than about 0.250 inch. The axle spindle 424a has dimension or distance B from the annular shoulder surface 464 to the outboard beginning of the radiused portion 446a. For axle spindle 424a the distance B is about 0.226 inch but no greater than about 0.280 inch. The dimension or diameter C of the bearing support surface 44 is about 3.54 inches. The axle spindle 424a may have a transition point TP at which the radiused portion 446a blends into the radiused portion 448a. A dimension or diameter D at the transition point TP is about 3.652 inch. The axle spindle 424a has an offset dimension E extending inboard from annular shoulder surface 464 to the transition point TP for this configuration of the annular profile 440a. The offset dimension E may be about 0.017 inch but no more than 0.030 inch. The axle spindle 424a also has a dimension or inner diameter G of about 2.45 inches and no more than 2.48 inches.

A ratio of D/C is 1.032 and no less than 1.03 for axle spindle 424a as long as the radius R42 is more than 0.060 inch. There may be some configurations where the radius R42 may be less than 0.060 inch. Where the radius R42 happens to be less than 0.060 inch, the ratio of D/C would be greater than 1.05 for axle spindle 424a. The axle spindle 424a also has a ratio of C/G of 1.445 and no less than 1.44.

An axle spindle 424b (FIG. 9) has an annular profile 440b with another geometry. The annular profile 440b may be of any suitable size and shape that helps reduce strain and stress concentrations in the annular shoulder portion 462 of the axle spindle 424b. A radiused surface 444b of the annular profile 440b may be configured with multiple or blended radii of at least two different radii. Any suitable number of blended radii may be used to configure the radiused surface 444b of the annular profile 440b. The radiused surface 444b of the annular profile 440b may have any suitable configuration or combination of configurations, such as an arc, spline or curve.

The radiused surface 444b may have an annular surface defining a radiused portion 446b located between the annular shoulder surface 464 and the inboard bearing support surface 44. The radiused portion 446b helps transition the inboard bearing support surface 44 in a direction toward the annular shoulder surface 464. The radiused portion 446b has a radius R41 (FIG. 12). The radius R41 of the radiused portion 446b may be at least about 0.375 inch.

The radiused surface 444b of the annular profile 440b may have another annular surface defining a radiused portion 448b located between the radiused portion 446b and the annular shoulder surface 464 of the shoulder portion 462. The radiused portion 448b transitions the radiused portion 446b in a direction toward the annular shoulder surface 464. The radiused portion 448b has a radius R42 that is preferably less than the radius R41 of the radiused portion 446b. The radius R42 of the radiused portion 448b may be about 0.075 inch but no less than 0.060 inch. A ratio of the radius R41 to the radius R42 is preferably in a range from about 5:1 to about 10:1. No part of the surface of the radiused portion 446b and no part of the surface of the radiused portion 448b have a diameter that is less than the diameter of the inboard bearing support surface 44.

The annular profile 440b may have an inclined surface or continuously annular frustoconical segment 442b (FIGS. 9 and 12) extending radially inward from the annular shoulder surface 464 and blending into the radiused surface 444b. The frustoconical segment 442b may extend at an acute angle F relative to the annular shoulder surface 464 about 17.5°.

The radiused surface 444b of the annular profile 440b is located between the frustoconical segment 442b and the bearing support surface 44 and includes radiused portions 446b and 448b. The radiused surface 444b forms the bottom or radially inward portion, as viewed in FIGS. 9 and 12, of the annular profile 440b and transitions the frustoconical segment 442b into the bearing support surface 44. The radiused surface 444b, in any configuration, has no portion with a diameter that is less than the diameter of the inboard bearing support surface 44.

The axle spindle 424b (FIG. 12 without the letter suffixes) has a dimension or distance RE from the bearing support surface 44 to the start of the annular profile 440b. For axle spindle 424b the distance RE is about 0.217 inch but no greater than about 0.250 inch. The axle spindle 424 has a dimension or distance B from the annular shoulder surface 464 to the beginning of the radiused portion 446b. For axle spindle 424b the distance B is about 0.24 inch but no greater than about 0.28 inch. The dimension or diameter C of the bearing support surface 44 is about 3.54 inches. The axle spindle 424b may have a transition point TP at which the radiused portion 446b blends into the radiused portion 448b. A dimension or diameter D at the transmission point TP is 3.702 inch. The axle spindle 424b has an offset dimension E extending outboard from the annular shoulder surface 464 to the transition point TP for this configuration of the annular profile 440b. The offset dimension E is about 0.008 inch but no more than 0.055 inch. The axle spindle 424b also has a dimension or inner diameter G of about 2.45 inches and no more than 2.48 inches. A ratio of D/C is 1.046 and no less than 1.03 for axle spindle 424b. The axle spindle 424b also has a ratio of C/G of 1.445 and no less than 1.44.

An axle spindle 424c (FIG. 10) has a corner transition configuration in the form of annular profile 440c with a radiused surface 444c of another geometry. The annular profile 440c may be of any suitable size and shape that helps reduce strain and stress concentrations in the annular shoulder portion 462 of the axle spindle 424c. The radiused surface 444c of the annular profile 440c may be configured with multiple or blended radii of at least two different radii. Any suitable number of blended radii may be used to configure the radiused surface 444c of the annular profile 440c. The radiused surface 444c of the annular profile 440c may have any suitable configuration or combination of configurations, such as an arc, spline or curve.

The radiused surface 444c of the annular profile 440c may have an annular surface defining a first radiused portion 446c located between the annular shoulder surface 464 and the inboard bearing support surface 44. The first radiused portion 446c helps transition the inboard bearing support surface 44 in a direction toward the annular shoulder surface 464. The first radiused portion 446c has a first radius R41 (FIG. 12). The first radius R41 of the first radiused portion 446c may be about 0.45 inch.

The radiused surface 444c of the annular profile 440c may have another annular surface defining a radiused portion 448c located between the first radiused portion 446c and the annular shoulder surface 464 of the shoulder portion 462. The second radiused portion 448c transitions the radiused portion 446c in a direction toward the annular shoulder surface 464. The radiused portion 448c has a second radius R42 that is preferably less than the first radiused surface R41 of the first radiused portion 446. The second radius R42 of the second radiused portion 448c may be about 0.07 inch but no less than 0.060 inch. A ratio of the radius R41 to the radius R42 is preferably in a range from about 5:1 to about 10:1. No part of the surface of the radiused portion 446c and no part of the surface of the radiused portion 448c have a diameter that is less than the diameter of the inboard bearing support surface 44.

The annular profile 440c may have an inclined surface or continuously annular frustoconical segment 442c (FIGS. 10 and 12) extending radially inward from the annular shoulder surface 464 and blending into the radiused surface 444c. The frustoconical segment 442c may extend at an acute angle F relative to the annular shoulder surface 464 about 5°. Thus, the frustoconical segments 442a, 442b, 442c may extend at an angle relative to the longitudinal central axis A of the axle spindle 424 in the range of about 45° to about 85°.

The radiused surface 444c of the annular profile 440c is located between the frustoconical segment 442c and the bearing support surface 44. The radiused surface 444c forms the bottom or radially inward portion, as viewed in FIGS. 10 and 12, of the annular profile 440c and transitions the frustoconical segment 442c into the bearing support surface 44. The radiused surface 444c, in any configuration, has no portion with a diameter less than the diameter of the inboard bearing support surface 44.

The axle spindle 424c (FIG. 12 without the letter suffixes) has a dimension or distance RE from the bearing support surface 44 to the start of the annular profile 440c. For axle spindle 424c the distance RE is about 0.217 inch but no greater than about 0.250 inch. The axle spindle 424c has dimension or distance B from the annular shoulder surface 464 to the beginning of the radiused portion 446c. For axle spindle 424c the distance B is about at the maximum of 0.28 inch. The dimension or diameter C of the bearing support surface 44 is about 3.54 inches. The axle spindle 424c may have a transition point TP at which the radiused portion 446c blends into the radiused portion 448c. A dimension or diameter D at the transmission point TP is about 3.702 inch. The axle spindle 424c has an offset dimension E extending outboard from the annular shoulder surface 464 to the transition point TP for this configuration of the annular profile 440c. The offset dimension E is about 0.023 inch but no more than 0.070 inch. The axle spindle 424c also has a dimension or inner diameter G of about 2.45 inches and no more than 2.48 inches. A ratio of D/C is 1.046 and no less than 1.03 for axle spindle 424c. The axle spindle 424c also has a ratio of C/G of 1.445 and no less than 1.44.

An axle spindle 424d (FIG. 11) has a corner transition configuration in the form of annular profile 440d with a radiused surface 444d of a different suitable geometry. The annular profile 440d may be of any suitable size and shape that helps reduce strain and stress concentrations in the annular shoulder portion 462 of the axle spindle 424d. The radiused surface 444d of the annular profile 440d may be configured with multiple or blended radii of at least two different radii. Any suitable number of blended radii may be used to configure the radiused surface 444d of the annular profile 440d. The radiused surface 444d of the annular profile 440d may have any suitable configuration or combination of configurations, such as an arc, spline or curve. In this aspect, the annular profile 440d has no surface with a diameter that is less than the diameter of the shoulder surface 464. Unlike other aspects, the annular profile 440d has no annular frustoconical segment.

The radiused surface 444d of the annular profile 440d may have an annular surface defining a radiused portion 446d located between the annular shoulder surface 464 and the inboard bearing support surface 44. The radiused portion 446d helps transition toward the inboard bearing support surface 44 in a direction toward the annular shoulder surface 464. The radiused portion 446d has a radius R41 (FIG. 12). The radius R41 of the radiused portion 446d may be in the range of about 0.375 inch to about 0.625 inch and preferably about 0.50 inch.

The radiused surface 444d of the annular profile 440d may have another annular surface defining a radiused portion 448d located between the first radiused portion 446d and the annular shoulder surface 464 of the shoulder portion 462. The radiused portion 448d transitions the radiused portion 446d in a direction toward the annular shoulder surface 464. The radiused portion 448d has a radius R42 that is preferably less than the radius R41 of the radiused portion 446. The radius R42 of the radiused portion 448d may be in the range of about 0.060 inch to about 0.125 inch and preferably about 0.094 inch. A ratio of the radius R41 to the radius R42 is preferably in a range from about 5:1 to about 10:1. No part of the surface of the radiused portion 446d and no part of the surface of the radiused portion 448d has a diameter less than the diameter of the inboard bearing support surface 44.

The axle spindle 424d (FIG. 12 without the letter suffixes) has a dimension or distance RE from the bearing support surface 44 to the start of the annular profile 440d. For axle spindle 424d the distance RE is about 0.138 inch but no greater than about 0.250 inch. The axle spindle 424b has dimension or distance B from the annular shoulder surface 464 to the beginning of the radiused portion 446d. For axle spindle 424d the distance B is about 0.273 inch and no more than 0.280 inch. The dimension or diameter C of the bearing support surface 44 is about 3.54 inches. The axle spindle 424d may have a transition point TP at which the radiused portion 446d blends into the radiused portion 448d. A dimension or diameter D at the transmission point TP is 3.65 inch. The axle spindle 424d has an offset dimension E extending outboard from the annular shoulder surface 464 to the transition point TP for this configuration of the annular profile 440d. The offset dimension E is about 0.051 inch but no more than 0.070 inch. The axle spindle 424d also has a dimension or inner diameter G of about 2.45 inches and no more than 2.48 inches. A ratio of D/C is 1.031 and no less than 1.03 for axle spindle 424d. The axle spindle 424d also has a ratio of C/G of 1.445 and no less than 1.44. It will be apparent that annular profile 440d has no E dimension in FIG. 12.

Figure 13:
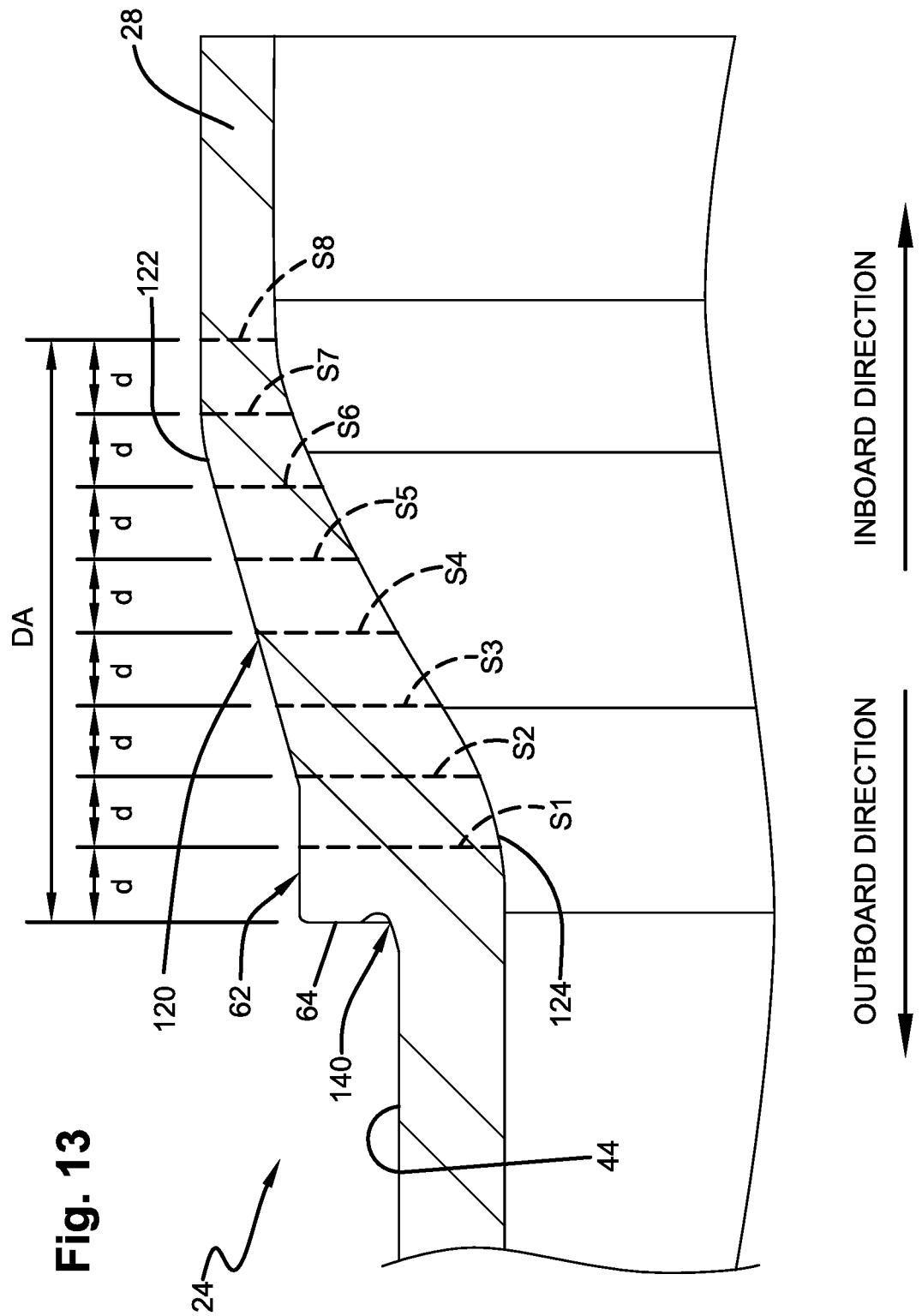
FIG. 13 is an enlarged cross-sectional view of an axle spindle illustrating a feature of the axle spindle constructed according to an aspect of the disclosed subject matter.
Figure 15:
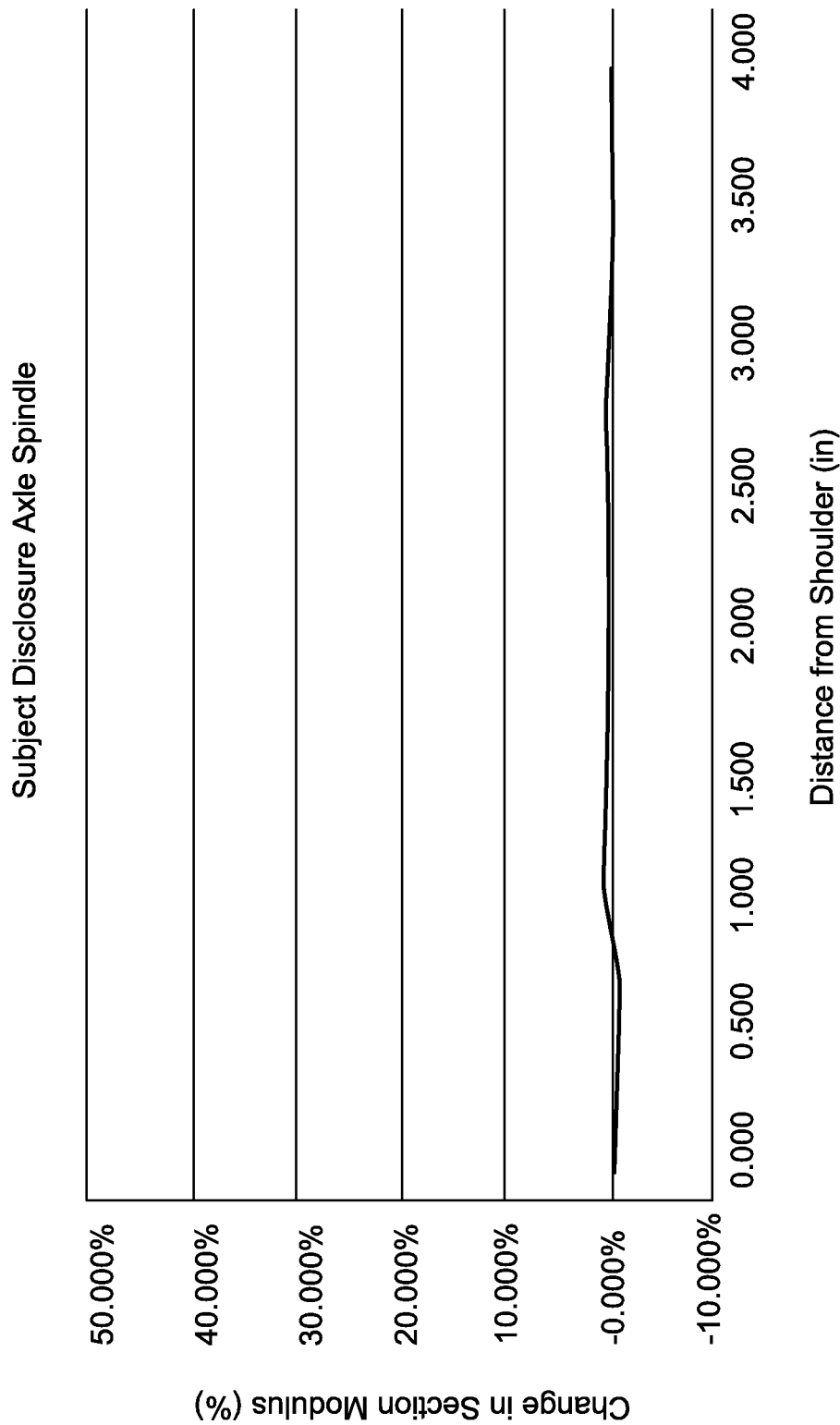
FIG. 15 is a graph of a change of section modulus as a function of distance along a portion of the axle spindle constructed according to an aspect of the disclosed subject matter.

The axle spindle 24, 224 of the subject disclosure possesses another important feature that contributes to providing a relatively strong and light weight axle spindle with a relatively thin-wall, as illustrated in FIGS. 13 and 15. The axle spindle 24, 224 has an outer surface 122 and an inner surface 124 with specific axially extending profiles in certain regions of the axle spindle, such as the transition section 120. These specific profiles produce relatively lower stress in the transition section 120 and provides a relatively small rate of change of section modulus in the transition section in comparison to previously known axle spindles at the same GAWR.

Lower stress and small rate of section modulus change result from a relatively wide choice of axially extending inner and outer surface profile parameters for the axle spindle 24, 224, such as radius size, and/or location of radiused surfaces. The lower stress and small rate of section modulus change is enabled by the configuration of an annular profile configuration and/or the inner and outer surface profiles of the axle spindle 24, 224. The axle spindle 24, 224 is designed and manufactured to have the relatively small rate of section modulus change in the axial direction in at least the annular shoulder portion 62 and possibly a portion of the tubular transition section 120.

By way of example, the representative axle spindle 24 (FIG. 13) has a relatively small rate of section modulus change in an axial direction in the annular shoulder portion 62. The relatively smooth and/or small rate of section modulus change helps reduce localized stress concentrations and smoothly distributes stress to maintain or improve fatigue life.

The tubular transition section 120 is formed with a configuration that provides the relatively small rate of change in section modulus at least in the annular shoulder portion 62. The annular shoulder portion 62 has a portion with a rate of change of section modulus between adjacent analysis slices S1-S8 (FIG. 13) taken through the tubular transition section 120 in planes extending normal to a longitudinal central axis (not shown) of the axle spindle 24. The rate of change in section modulus taken in an inboard direction away from the annular shoulder surface 64 is relatively smooth and small between adjacent calculated slices S1-S8 spaced apart in 0.050 inch increments. The relatively smooth and/or relatively small rate of section modulus change reduces localized stress concentrations and smoothly distributes stress to maintain or improve fatigue life.

The annular shoulder portion 62 and tubular transition section 120 have a section modulus calculated at each slice S1-S8 over a predetermined analysis distance DA. In one particular analysis mode, the slices S1-S8 are equally spaced apart a distance d of 0.050 inch from the annular shoulder surface 64 in the inboard direction. FIG. 13 shows only eight (8) slices S1-S8 for clarity. In the actual calculations there were approximately 80 slices over the analysis distance DA accounting for the 4.000 inch on the Distance from Shoulder axis in FIGS. 14 and 15. The calculated results for the axle spindle 24 of the subject disclosure were compared to calculated results of a prior art axle spindle rated for the GAWR. The prior art axle spindle was analyzed at the same slice spacing distance d over the same analysis distance DA from the annular shoulder surface. It will be seen that a change in section modulus typically occurs between the 0.500 inch to 1.500 inch distances from the shoulder surface.

Figure 14:
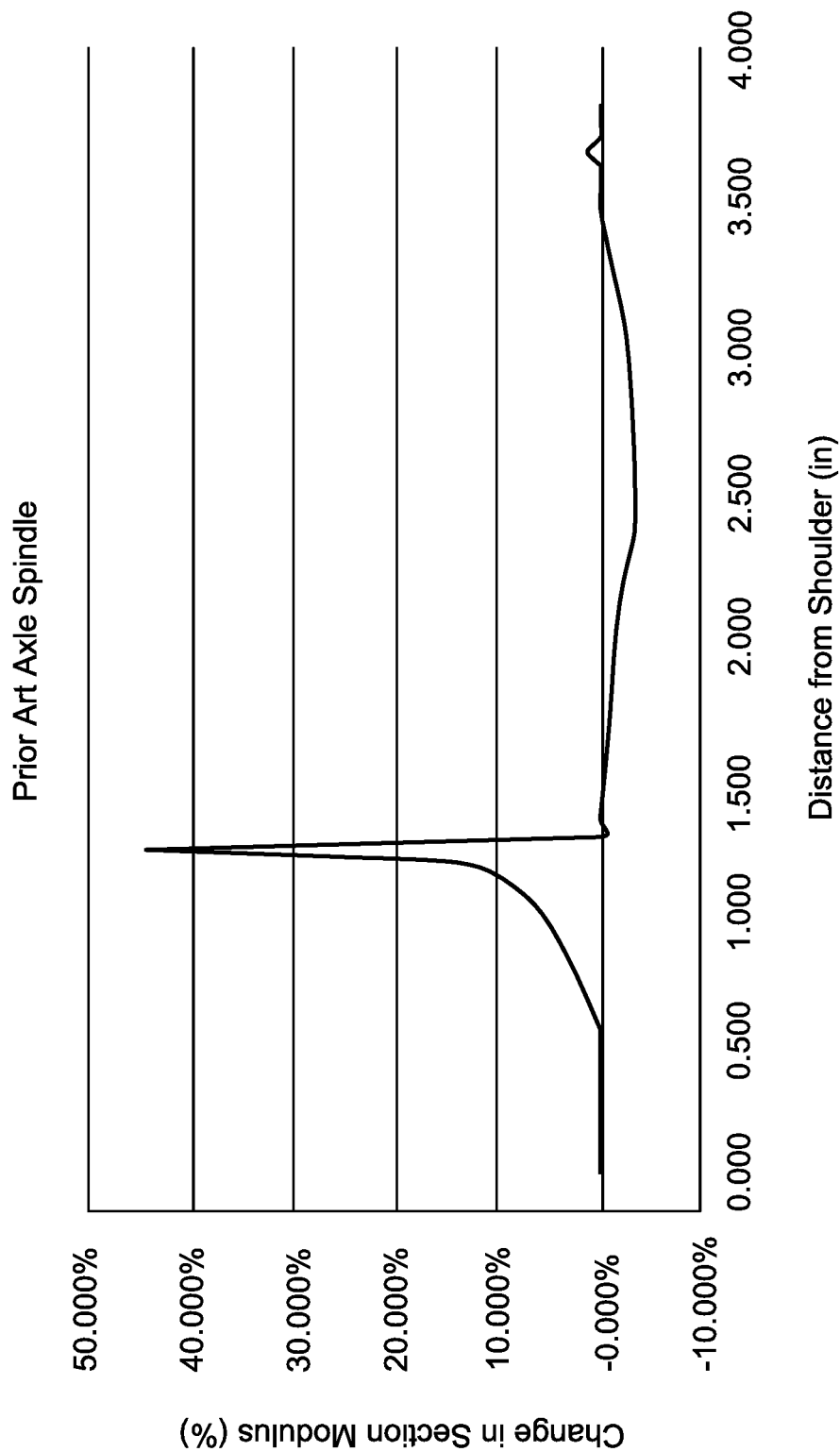
FIG. 14 is a graph of a change of section modulus as a function of distance along a portion of a prior art axle spindle.

The results of the analysis of the prior art axle spindle is illustrated in FIG. 14. It can be seen that the prior art axle spindle has a dramatic change in section modulus between 1.000 inch and 1.500 inches inboard from its shoulder end surface. The change in section modulus in that region can vary by over +40% from a starting slice S1 and overall about 50% peak-to-peak. It is well-known that dramatic changes in section modulus can cause undesirable localized increased stress concentrations.

The results of the analysis of the axle spindle 24, according to one configuration of the subject disclosure, is illustrated in FIG. 15. The graphical representation illustrated in FIG. 15 is on the same scale as the graphical representation illustrated in FIG. 14. It can be seen that the change in section modulus over the entire analysis distance DA is significantly reduced in axle spindle 24. The change in section modulus between adjacent analysis slices S1-S8 spaced apart in 0.050 inch increments for the axle spindle 24 varies by no more than about 10% and preferably no more than about 5% taken from a starting slice S1 and overall about 3% peak-to-peak. This relatively smooth and/or small rate of section modulus change reduces localized stress concentrations and smoothly distributes stress to maintain or improve fatigue life. It is believed that a rate of change in stress of less than about 20%, preferably less than 10%, and more preferably less than 5% provides advantageous and desirable relatively lower localized and evenly distributed stress.

The annular shoulder portion 62 of the axle spindle 24 typically experiences relatively heavy loads and stress, for example, bending stress, Hertzian contact stress and/or axial stress. Bending stress typically increases due to stress concentration from a rapid section change of diameters as evidenced by a rate of change in section modulus, such as that illustrated in FIG. 14. It is desirable to do as much as possible within design parameters to reduce stress concentrations and rapid change in section modulus.

The advantages of the annular profile 140, 340, 440 and/or specific axially extending profiles of the outer surface 122 and inner surface 124 in certain regions of the axle spindle, such as the transition section 120, reduces stress concentrations. The smooth and small rate of change in section modulus in the axle spindle 24 may yield optimal physical and performance characteristics of the axle spindle, especially in the annular shoulder portion 62. The resultant structure of axle spindle 24 and the annular shoulder portion 62 provides a thinner and relatively lighter weight axle spindle. This is demonstrably illustrated by the differential wall thicknesses DWTi and DWTo (FIG. 18) of the axle spindle 24 compared to a prior art axle spindle 160.

The annular profile 140, 340, 440 and/or specific axially extending profiles of the outer surface 122 and inner surface 124 reduce strain and stress concentrations in the annular shoulder portion 62, 262 and transition section 120, 320 and, thus may increase the fatigue life of the axle spindle 24, 224. The annular profile 140, 340, 440 and/or specific axially extending profiles of the outer surface 122 and inner surface 124 also increase the life of the bearing 48, 248 because the axle spindle 24, 224 can decrease fretting of the annular shoulder surface 64, 264. The annular profile 140, 340, 440 can also increase the amount of time before fretting becomes an issue by providing additional space for lubricant to occupy and for receiving any dislodged material of the shoulder surface 64, 264 that occurs due to eventual fretting. The annular profile 140, 340, 440 may not completely prevent fretting or galling, as fretting and/or galling will eventually occur no matter what due to axial loading that occurs during operation of the heavy-duty vehicle.

The disclosed subject matter successfully incorporates a relatively lightweight one-piece integrally formed axle spindle 24, 224 into a wheel end assembly and axle assembly for heavy-duty vehicles. More specifically, the axle spindle 24, 224 of the disclosed subject matter can save weight and material by providing a relatively thinner wall than previously known axle spindles, yet still provide the requisite strength, performance characteristics, such as increased bearing life and durability, that are required in the transportation industry.

Figure 19:
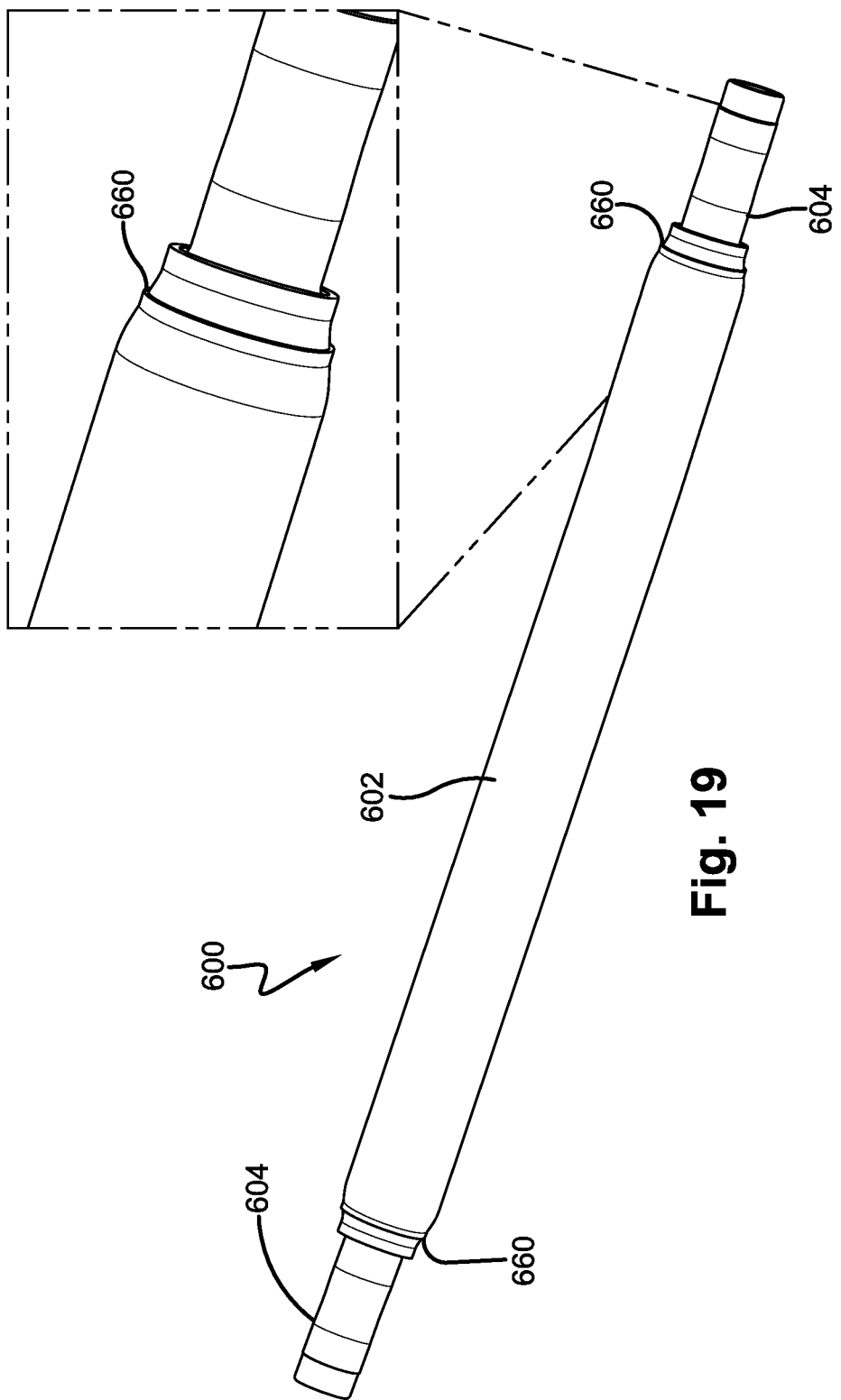
FIG. 19 is a perspective view of an axle assembly constructed according to another aspect of the disclosed subject matter incorporating an axle spindle.
Figure 20:
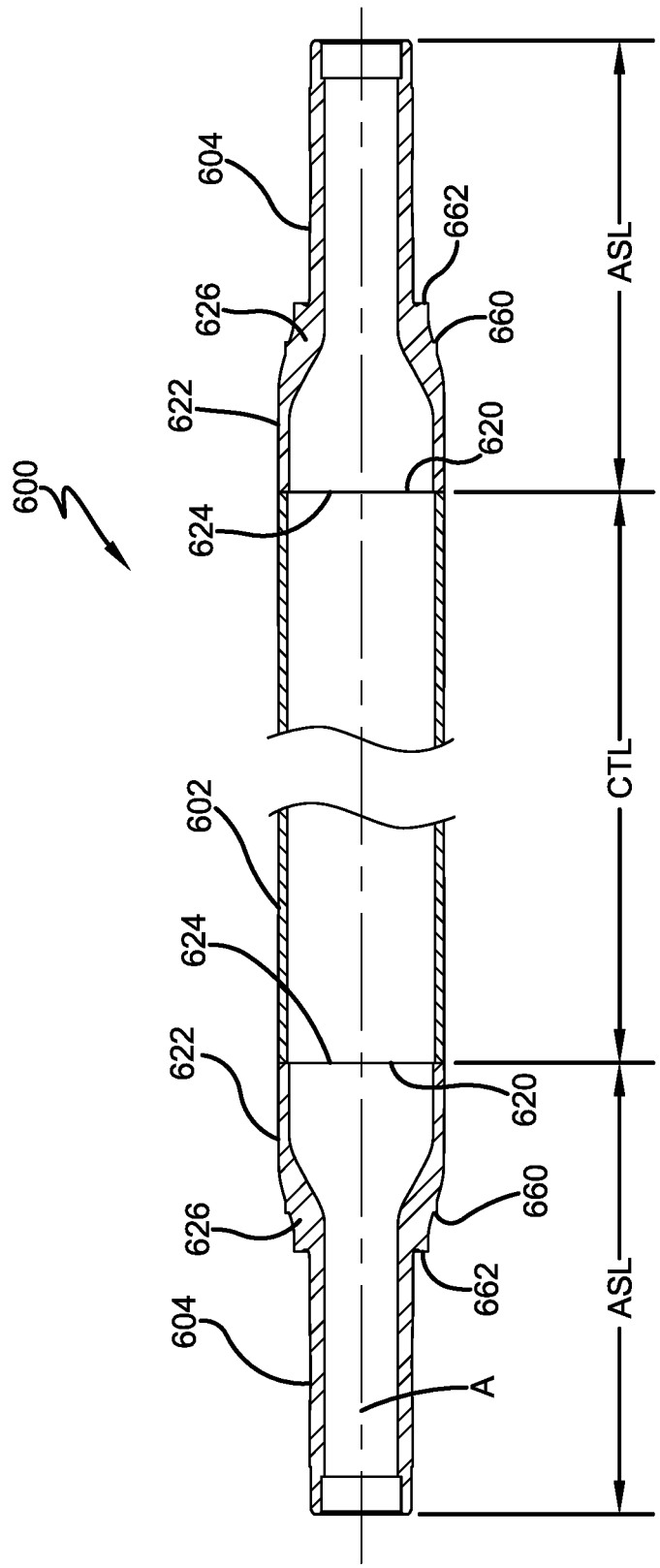
FIG. 20 is a fragmentary cross-sectional view of the axle assembly illustrated in FIG. 19.

An axle assembly 600 for a heavy-duty vehicle, constructed according to an aspect of the disclosed subject matter, is illustrated in FIG. 19. The axle assembly 600 includes a central tube 602 and a pair of axle spindles 604. The axle spindles 604 are permanently attached or fixed to axially opposite ends of the central tube 602 by a suitable method, such as friction welding as will be described below. The axle assembly 600 has a longitudinal central axis A (FIGS. 20-23). The central tube 602 and tubular axle spindles 604 are located coaxially along the longitudinal central axis A of the axle assembly 600.

The central tube 602 is hollow or tubular with any appropriate cross-sectional shape and size. Preferably, the central tube 602 has a round cross-section taken in a plane perpendicular to the longitudinal central axis A and axially opposite annular end surfaces 620. The central tube 602 is elongated with a length CTL (FIG. 20) appropriate for the application in which it will be used. The central tube 602 may be made of any suitable material, such as steel. The central tube 602 has an outer diameter in the range of about 4.90 inches to about 6.00 inches.

Figure 24:
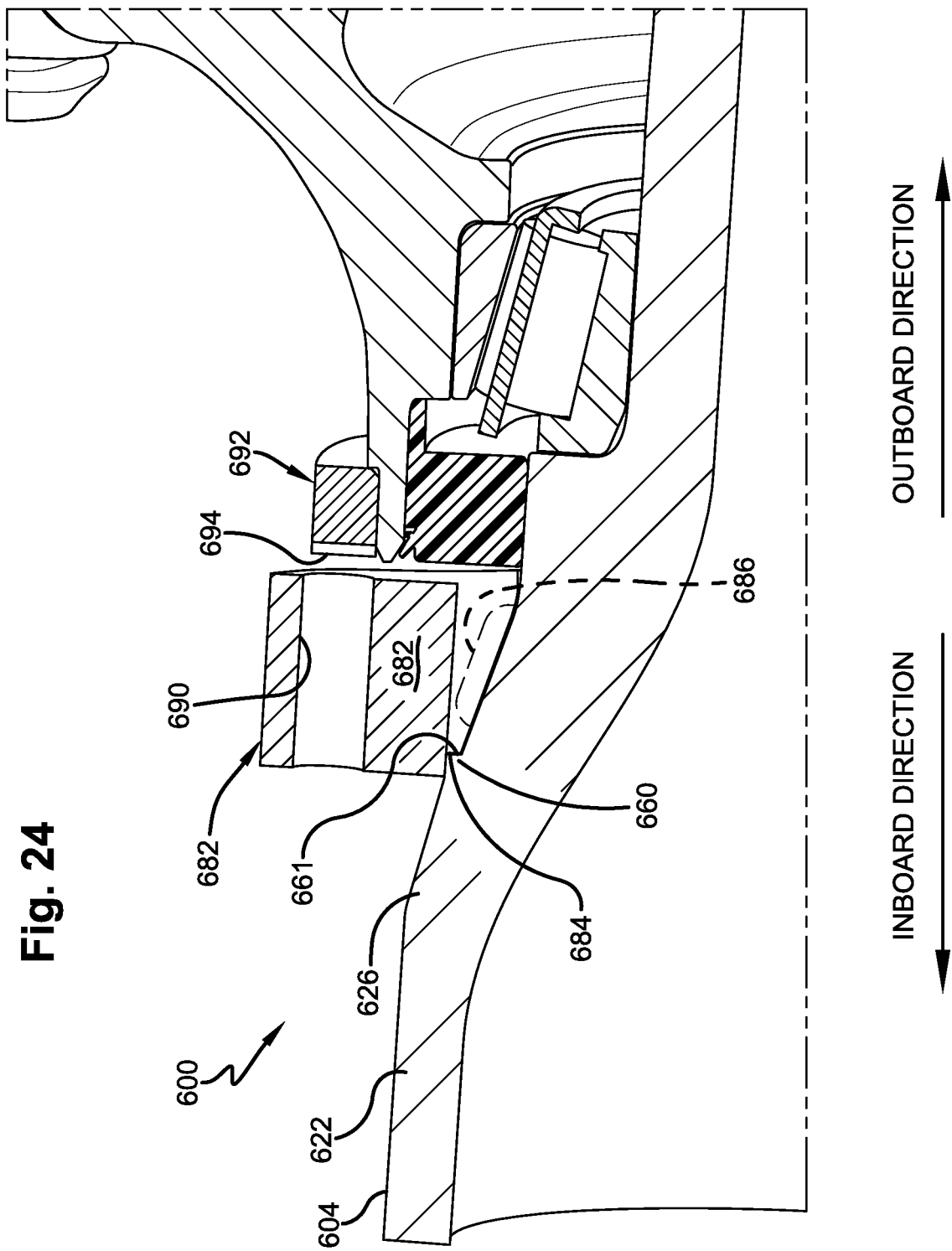
FIG. 24 is an enlarged fragmentary cross-sectional view of a portion of the axle spindle in FIG. 23 illustrating an antilock braking system sensor bracket located and mounted on an antilock braking system sensor bracket locator nub.
Figure 25:
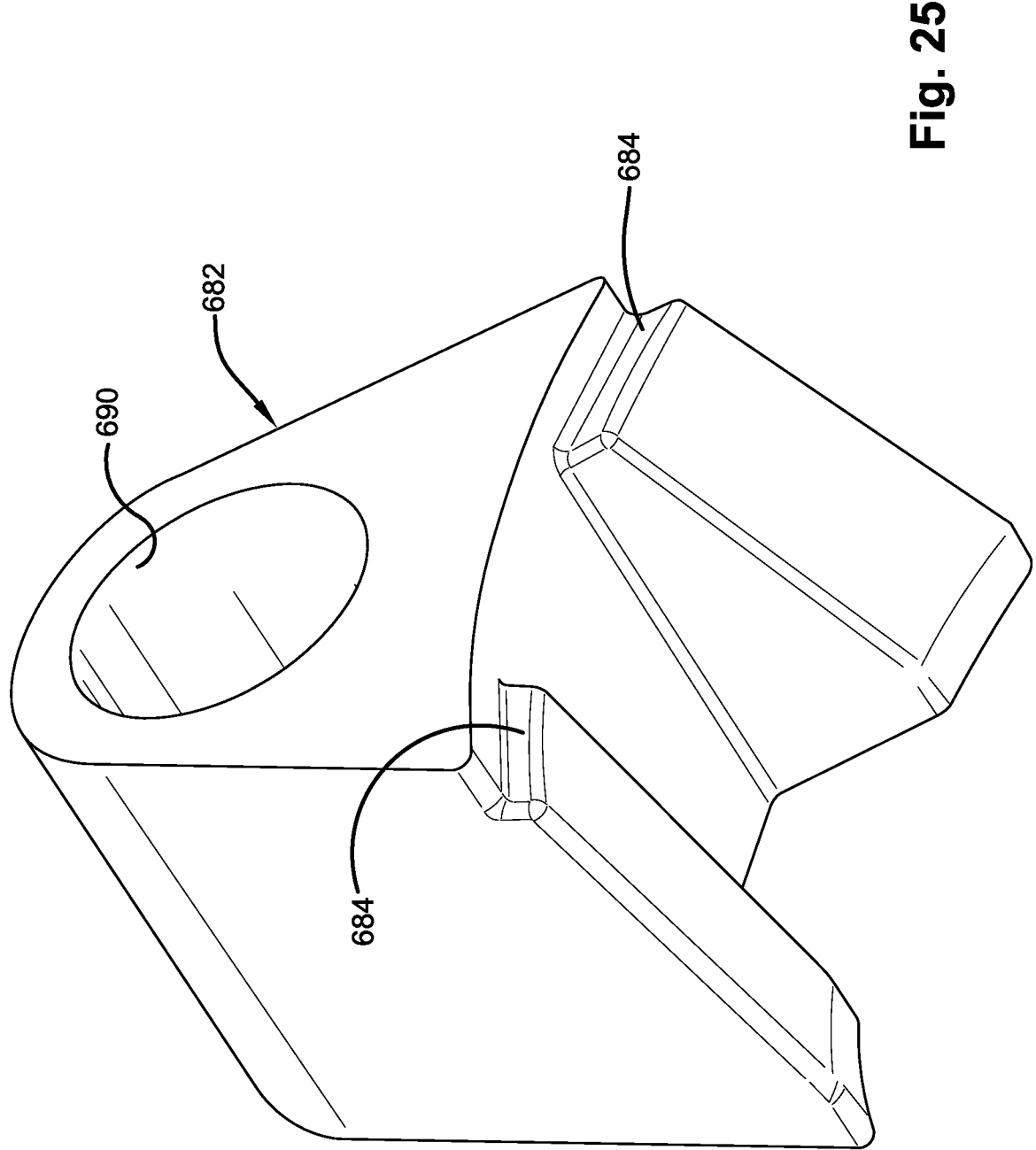
FIG. 25 is an enlarged perspective view of the antilock braking system sensor bracket illustrated in FIG. 24.

Each of the of the axle spindles 604 is preferably hollow or tubular over its entire length ASL and has a round tubular end portion or skirt 622 with an annular end surface 624. Each of the of the axle spindles 604 also includes a tubular transition section 626 extending axially outboard from the tubular end portion or skirt 622 and reducing in outer diameter over its axial extent in a direction away from the annular end surface 624. The axle spindles 604 may be made of any suitable material, such as steel. Preferably, the inner and outer diameters of the tubular end portion or skirt 622 of the axle central tube 602 and of the axle spindle 604 are substantially the same at their respective annular end surfaces 620, 624. It is contemplated that the inner diameters of the central tube 602 and the skirt 622 could be different. Each of the axle spindles 604 may include the structure, features, properties and strength of the axle spindles 24, 224, 424 described above. Each of the axle spindles 604 may also include an antilock braking system sensor bracket locator nub 660 (FIGS. 23 and 24) to easily locate an antilock braking system sensor bracket 682 (FIG. 25).

The annular end surface 620 of the axle central tube 602 and the annular end surface 624 of axle spindle 604 are joined together by any suitable method according to an aspect. It will be appreciated that any suitable means of permanently joining an axle spindle 604 to the central tube 602 may be used, for example friction, MIG, TIG, arc, oxyacetylene gas, laser, projection, butt or capacitance welding, and the like. It will be appreciated that while the central tube 602 is illustrated and described as having an axially continuous round tubular cross-section for exemplary purposes, it could apply equally to other axle types and configurations, such as a drive axle with rectangular mating surfaces. What matters in the disclosed subject matter is that the end surface 620 of the axle central tube 602 and the end surface 624 of axle spindle 604 are similar in shapes and sizes.

Figure 21:
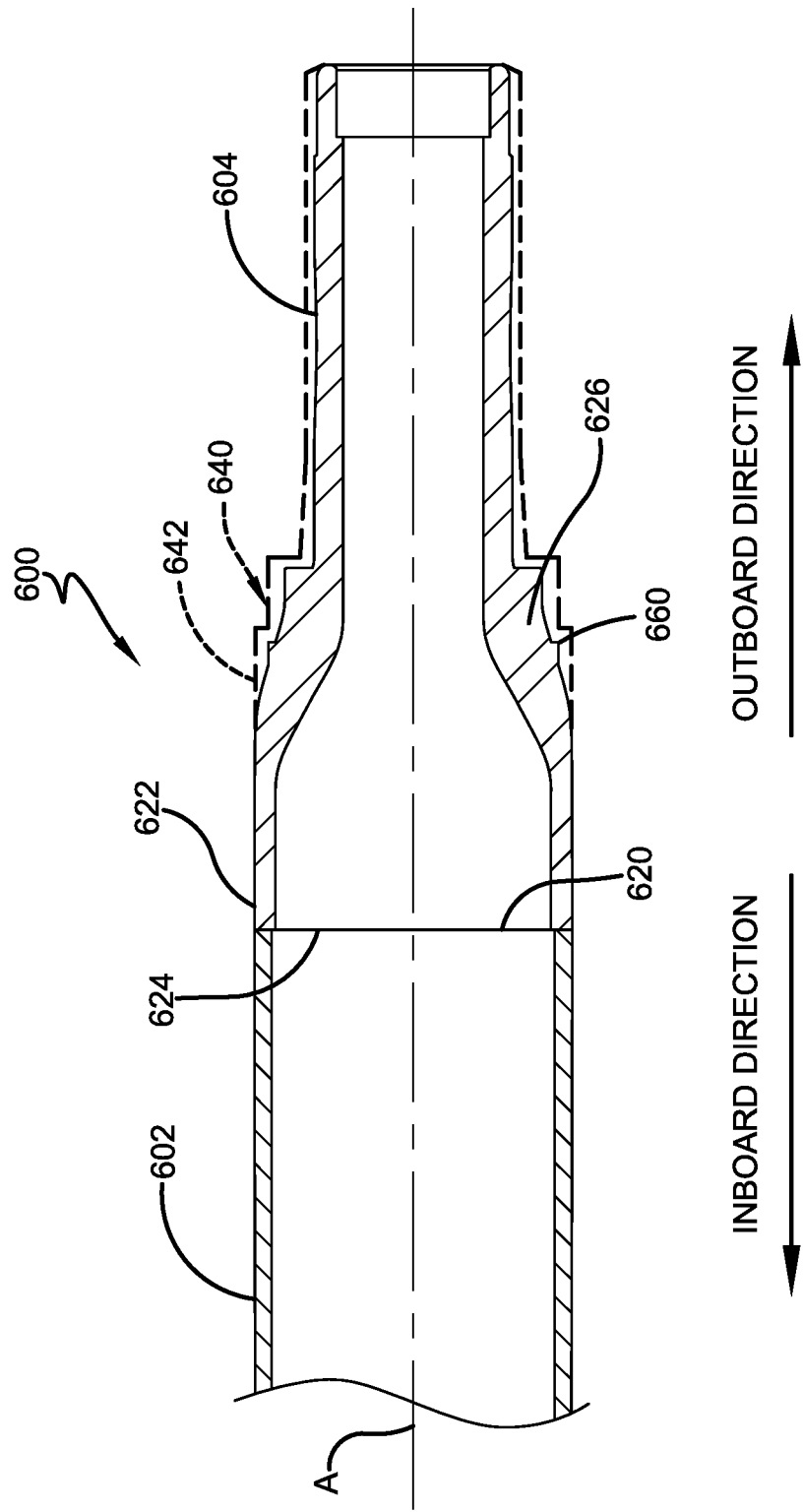
FIG. 21 is an enlarged cross-sectional view of a portion of the axle assembly of FIG. 20 illustrating a partially machined condition prior to machining and a finished machined condition.

The axle spindle 604 includes an unfinished portion or chucking land pad 640 with a circumferentially continuous arcuate ring 642 located in the transition section 626 and generally extending to or near an outboard end portion of the axle spindle 604. The unfinished portion or chucking land pad 640 is illustrated in FIG. 21 in dashed lines with respect to the finished configuration illustrated in solid lines. The unfinished portion or chucking land pad 640 may be of any suitable size and configuration.

Figure 22:
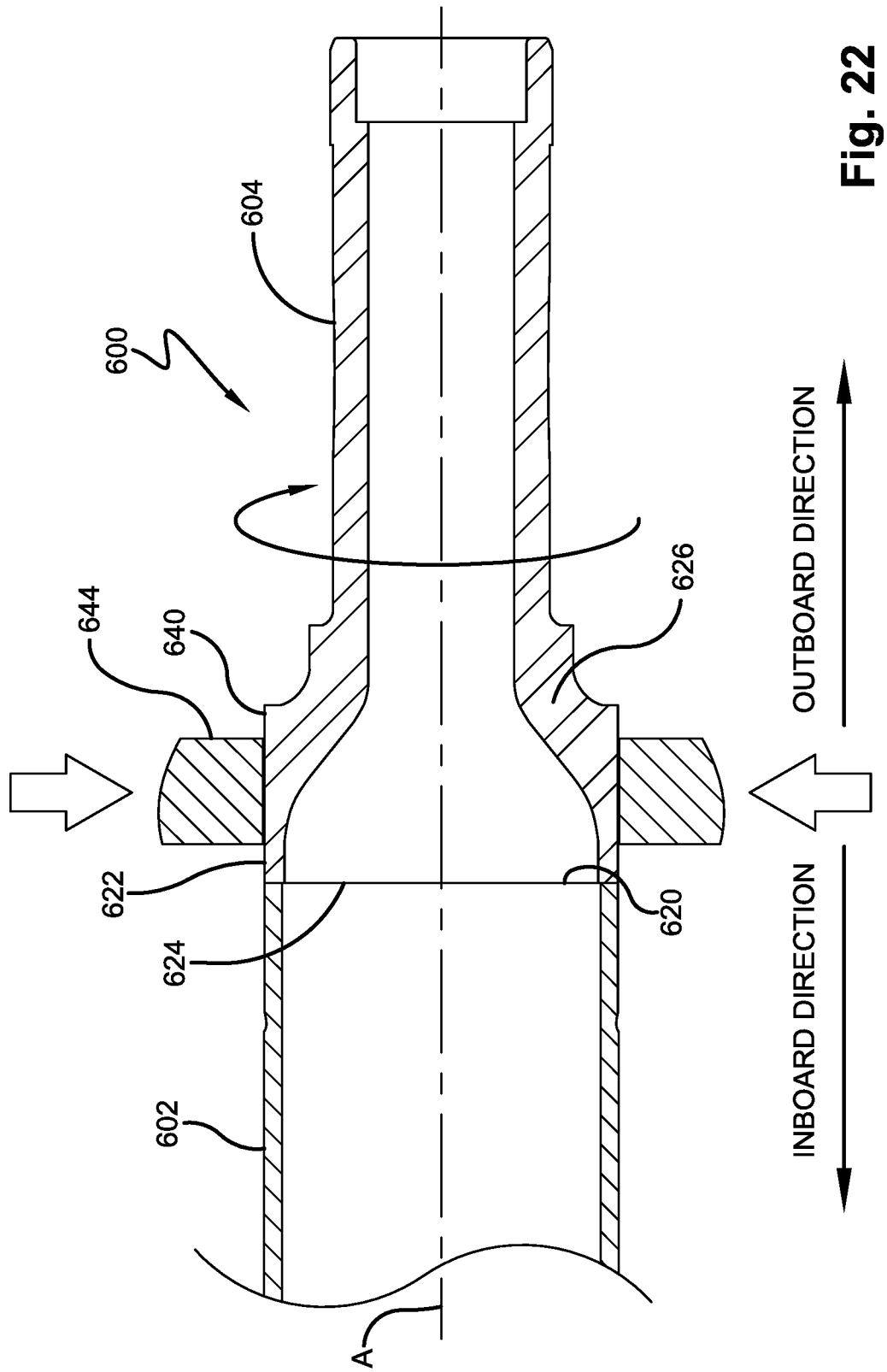
FIG. 22 is an enlarged cross-sectional view of the portion of the axle assembly of FIG. 21 illustrating a friction welding operation with an axle spindle prior to finished machining.

One of the suitable manufacturing processes is friction welding. For example, the central tube 602 can be held in a fixed, non-rotating, position. The annular ring 642 of one of the axle spindles 604 is engaged and gripped by tool or chuck apparatus 644 (FIG. 22). The chuck apparatus 644 rotates the axle spindle 604 relative to the central tube 602 and applies an axial force in a direction toward the central tube. Upon a sufficient time and axial pressure, a friction weld is formed at the end surfaces 620 and 624 and rotation of the axle spindle 604 ceases.

Figure 23:
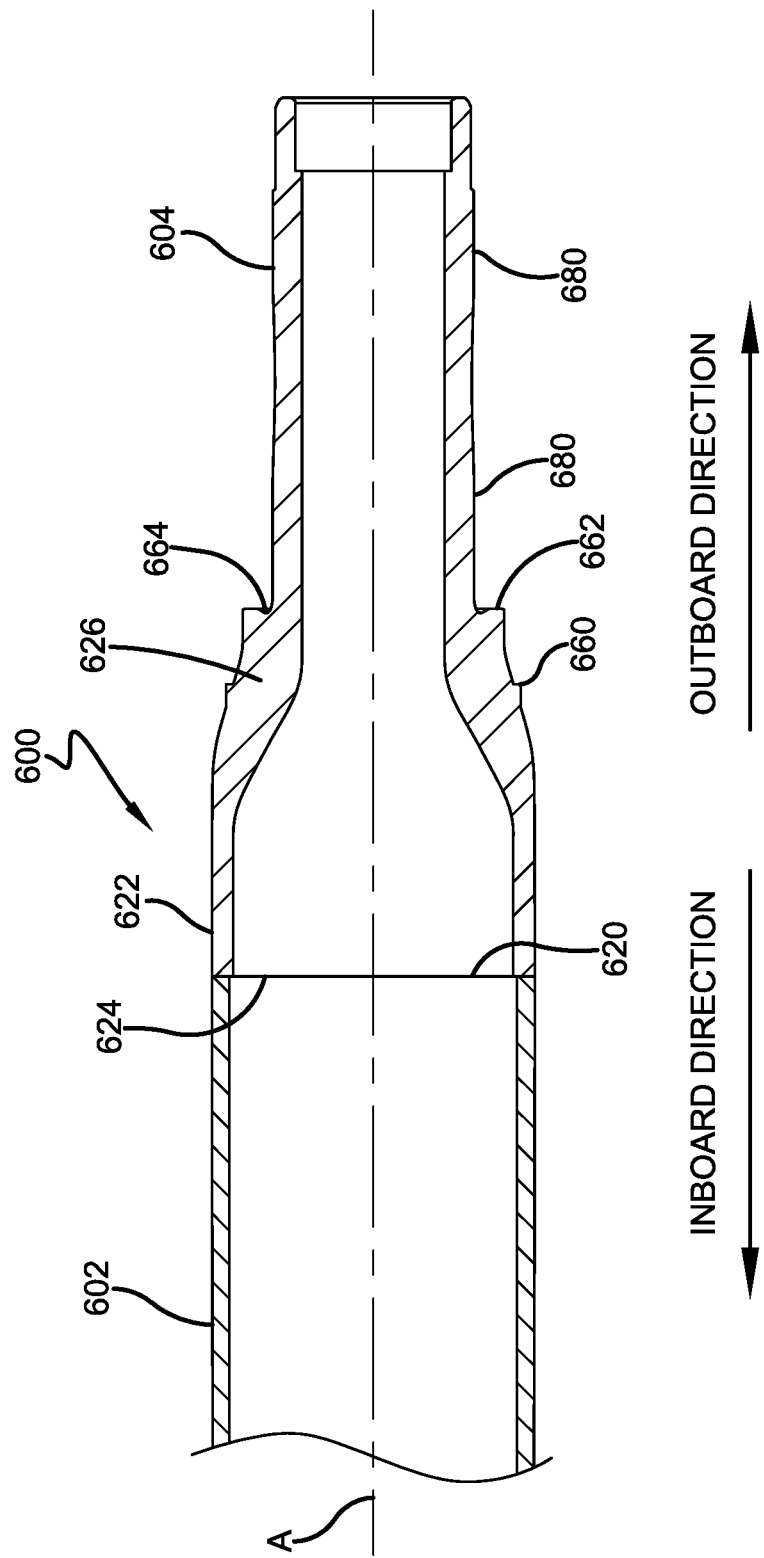
FIG. 23 is an enlarged cross-sectional view of the portion of the axle assembly of FIG. 22 illustrating the finished condition of the axle spindle incorporating an integral antilock braking system sensor bracket locator nub.

The unfinished portion or chucking land pad 640 is removed or machined away to a finished or near finished condition is illustrated in solid lines in FIG. 21. The antilock braking system (ABS) sensor bracket locator nub 660 results and is formed about the transition section 626 of the axle spindle 604. Preferably ABS sensor bracket locator nub 660 is formed as a continuous annular feature of the axle spindle 604 on the tubular transition section 626. The ABS sensor bracket locator nub 660 has a radially extending annular planar surface 661 facing outboard. The ABS sensor bracket locator nub 660 is preferably machined at the same time as a shoulder surface 662 to form an end of the tubular transition section 626. This concurrent machining establishes a consistent dimension of the ABS sensor bracket locator nub 660 from the finished shoulder surface 662 (FIG. 23).

The ABS sensor bracket locator nub 660 is used to locate an antilock braking system sensor bracket 682 (FIGS. 24 and 25) for an antilock braking system sensor (not shown). The consistent dimension of the ABS sensor bracket locator nub 660 from the shoulder surface 662 assures repeatable placement of the ABS sensor bracket 682 for all axle assemblies 600 being manufactured. The consistent dimension of the antilock braking system sensor bracket locator nub 660 from the shoulder surface 662 assures proper placement of the ABS sensor bracket 682 relative to teeth 694 of a tone ring 692 (FIG. 24). An antilock braking system sensor (not shown) may be located within a bore 690 of the ABS sensor bracket 682 for optimal positioning of the ABS sensor relative to the teeth 694 of the tone ring 692. The shoulder surface 662, along with an optional annular profile 664 in the transition section 626 and the bearing support surfaces 680 are preferably all machined at the same time. The annular profile 664 may be located in an axial end of the transition section 626 where the annular shoulder surface 662 transitions into a bearing support surface 680. The annular profile 664 may be configured the same as any of the annular profiles 140, 340, 440 described above or any suitable profile.

The ABS sensor bracket locator nub 660 also aids in quickly and efficiently properly locating the antilock braking system sensor bracket 682 during manufacturing. For example, the axle spindle 604 axially receives the ABS sensor bracket 682 from the outboard direction of the axle spindle. The ABS sensor bracket 682 is moved axially inboard until at least one stop surface 684 (FIG. 25) of the ABS sensor bracket, and preferably two, engages the radially extending axial end surface 661 of the ABS sensor bracket locator nub 660. The ABS sensor bracket 682 then can be fixed to the axle spindle 604 by suitable means, such as at least one weld 686. The ABS sensor can then be properly located in proximity to the tone ring 692 and its teeth 694.

Figure 26:
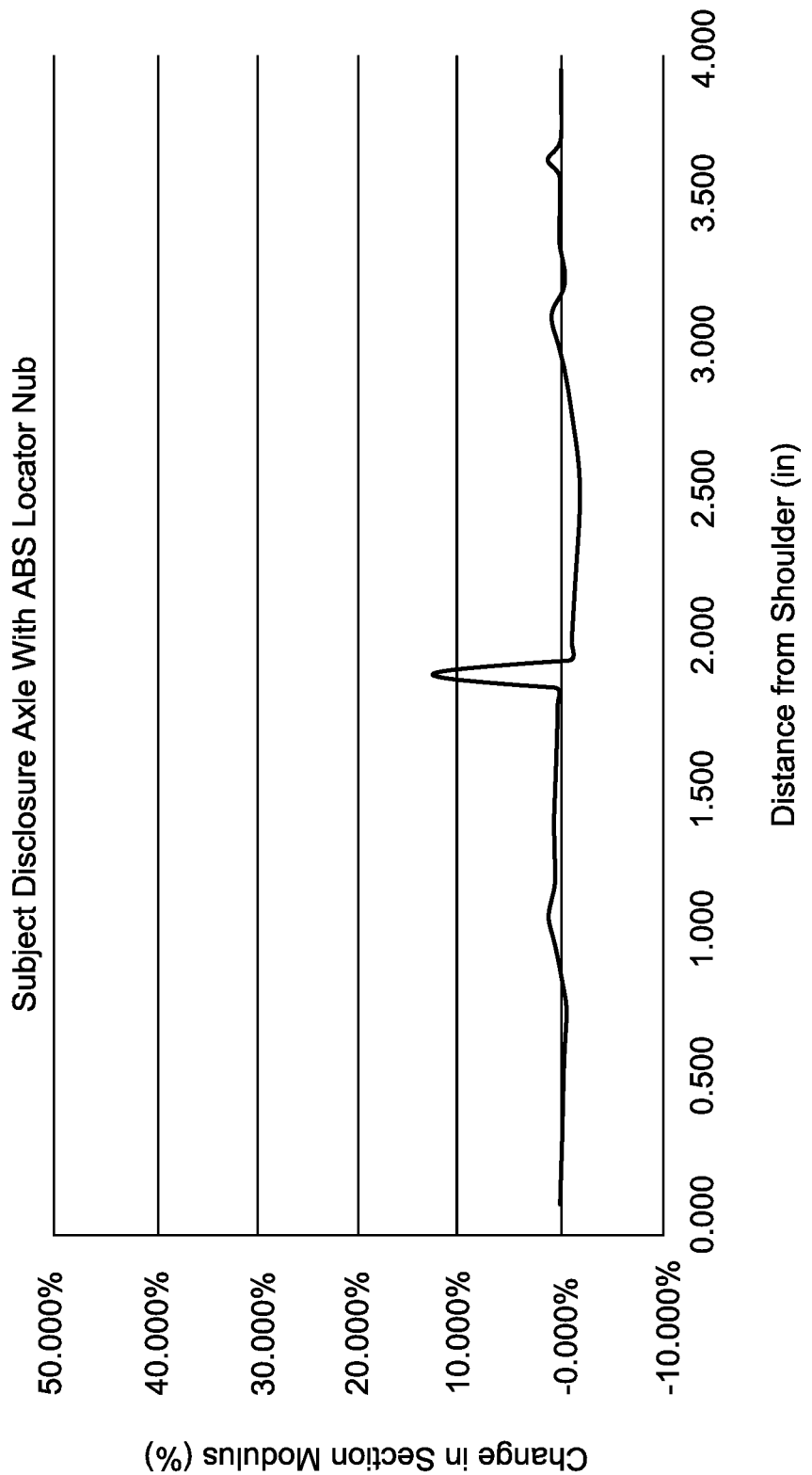
FIG. 26 is a graph of a change of section modulus as a function of distance along a portion of the axle spindle constructed according to another aspect of the disclosed subject matter.

The results of the analysis of the axle spindle 604 according to another configuration of the subject disclosure is illustrated in FIG. 26. The graphical representation illustrated in FIG. 26 is on the same scale as the graphical representation illustrated in FIG. 14 and analyzed as illustrated in FIG. 13 and described above. It can be seen that the change in section modulus over the entire analysis distance is significantly reduced in axle spindle 604. The change in section modulus between adjacent analysis slices spaced apart in 0.050 inch increments for the axle spindle 604 varies by no more than about 20% and preferably no more than about 14% taken from a starting slice S1. It should be apparent that if the axle spindle 604 is provided without the ABS sensor bracket locator nub 660, the change in section modulus between adjacent analysis slices would be essentially the same as for the axle spindle 24 and vary no more than about 10% and preferably no more than about 5% taken from a starting slice S1 and overall about 3% peak-to-peak.

The largest change in section modulus in the tubular transition section 626 is about 13% between adjacent slices occurs where the ABS sensor bracket locator nub 660 is located at about 1.86 inches inboard from the shoulder surface 662. This relatively smooth and/or small rate of section modulus change in the remainder of the axle spindle 604 reduces localized stress concentrations and smoothly distributes stress to maintain or improve fatigue life. It is believed that a rate of change in stress of less than about 20%, preferably less than 14% provides advantageous and desirable relatively lower localized and evenly distributed stress.

The tubular transition section 626 of the axle spindle 604 typically experiences relatively heavy loads and stress, for example, bending stress, Hertzian contact stress and/or axial stress. Bending stress typically increases due to stress concentration from a rapid section change of diameters as evidenced by a rate of change in section modulus, such as that illustrated in FIG. 26. It is desirable to do as much as possible within design parameters to reduce stress concentrations and rapid change in section modulus.

The axle spindle of the disclosed subject matter provides an improved axle spindle that is relatively light in weight, reduces material use and cost and increase axle spindle and bearing life. The improved axle spindle may better withstand localized stress and strain and to minimize the wear, fretting, galling and/or deformation of the shoulder during operation of the heavy-duty vehicle. The improved axle spindle has a relatively low rate of change in section modulus, especially in the shoulder portion. The improved axle spindle incorporates structure to easily locate and mount an antilock braking system sensor bracket. The improved axle spindle may be efficiently integrally formed as one-piece. The improved axle spindle is capable of using standard or stock bearings or that may incorporate custom bearings which can benefit from the improved features of the disclosed subject matter. The disclosed subject matter also provides a method of manufacturing the improved axle spindle.

It is to be understood that the disclosed subject matter finds application in all types of axle assemblies, axle spindles and wheel end assemblies, without affecting the concept or implementation of the disclosed subject matter. While reference has been made generally to a heavy-duty vehicle for the purpose of convenience, it is with the understanding that such reference to a heavy-duty vehicle includes trucks, tractor-trailers or semi-trailers, and trailers, and the like.

In the foregoing description, certain terms have been used for brevity, clarity and understanding, but no unnecessary limitations are to be implied beyond the requirements of the prior art, because such terms are used for descriptive purposes and are intended to be broadly construed. The disclosed subject matter has been described and illustrated with reference to at least one specific aspect. It is understood that this description and illustration is by way of example and not limitation. Potential modifications and alterations will occur to others upon a reading and understanding of the disclosed subject matter, and it is understood that the disclosed subject matter includes all such modifications, alterations and equivalents.

What is claimed is:

1. A method of making an axle assembly for a heavy-duty vehicle, the method comprising the steps of:
   providing a central tube;
   providing a hollow member;
   producing an axle spindle by:
      forming a first cylindrical section on the hollow member to have a portion with a first diameter;
      forming a second cylindrical section on the hollow member integrally with and extending in a direction away from the first cylindrical section, the second cylindrical section having a second diameter less than the first diameter;
      forming an unfinished transition section on the hollow member integrally with, and located between, the first cylindrical section and the second cylindrical section, the unfinished transition section tapering from the first cylindrical section to the second cylindrical section;
      forming a chucking land pad on the unfinished transition section;
   friction welding the axle spindle to the central tube by engaging the chucking land pad and rotating the axle spindle relative to the central tube; and
   machining away the chucking land to form a finished transition section.

2. The method of claim 1 wherein the machining step further includes the step of machining the chucking land pad to form an antilock braking system sensor bracket locator nub on the finished tapering transition section.

3. The method of claim 2 further including the step of locating an antilock braking system sensor bracket on the antilock braking system sensor bracket locator nub and fixing the antilock braking system sensor bracket to the axle spindle.

4. An axle spindle for a heavy-duty vehicle, the axle spindle for receiving at least one bearing assembly to support a hub for rotation relative to the axle spindle, the axle spindle comprising:
   a tubular first cylindrical section having a portion with a first outer diameter, the first cylindrical section having an end surface connectable with an axle central tube;
   a tubular second cylindrical section integrally and coaxially formed with and extending in a direction away from the first cylindrical section, the second cylindrical section having a second outer diameter less than the first diameter of the first cylindrical section, the second cylindrical section having at least one bearing support surface with a bearing support diameter to receive and support a bearing assembly;
   a tubular transition section integrally and coaxially formed with and located between the first cylindrical section and the second cylindrical section;
   an annular shoulder portion integrally and coaxially formed in an end segment of the tubular transition section adjacent the second cylindrical section, the shoulder portion having an annular shoulder surface for engaging an annular surface of the bearing assembly;
   an annular profile located in the shoulder portion between the annular shoulder surface and the bearing support surface, the annular profile defined by a surface having a third diameter that is not less than the bearing support diameter of the bearing support surface; and
   the annular profile defined by a first annular surface with a first radius taken in a plane containing a longitudinal central axis of the axle spindle, the first annular surface located between the annular shoulder surface and the bearing support surface, a second annular surface with a second radius taken in the plane containing the longitudinal central axis of the axle spindle, the second annular surface being located between the first annular surface and the bearing support surface, the second radius of the second annular surface being greater than the first radius of the first annular surface.

5. The axle spindle of claim 4 further including an antilock braking system sensor bracket locator nub formed in the tubular transition section.

6. The axle assembly of claim 5 further including an antilock braking system bracket engaging a surface of the antilock braking system sensor bracket locator nub, the antilock braking system bracket being fixed to the axle spindle.

7. The axle spindle of claim 4 wherein a rate of change in section modulus taken at an axial location between adjacent sections spaced apart in 0.050 inch increments from the shoulder surface in a direction towards the end surface of the tubular first cylindrical section varies no more than 10% for every rate of change in section modulus.

8. The axle spindle of claim 4 wherein the annular profile has a frustoconical segment extending in a direction radially inward from the annular shoulder surface.

9. The axle spindle of claim 8 wherein the frustoconical segment extends at an angle relative to a longitudinal central axis of the spindle in the range of 45° to 85°.

10. The axle spindle of claim 8 wherein the first radius is located between the frustoconical segment and the at least one bearing support surface of the second cylindrical section.

11. The axle spindle of claim 4 wherein the second radius is in a range from 0.375 inch to 0.625 inch and the first radius is in a range from 0.060 inch to 0.125 inch.

12. The axle spindle of claim 4 wherein the ratio of the second radius to the first radius is at least 5:1.

13. The axle spindle of claim 4 further including the transition section having an arcuate inner surface with a radius taken in the plane containing a longitudinal central axis of the axle spindle in a range of 8.00 inches to 12.00 inches.

14. An axle spindle for a heavy-duty vehicle wheel end, the axle spindle for receiving at least one bearing assembly for supporting a hub for rotation, the axle spindle comprising:
   a tubular first cylindrical section having a portion with a first outer diameter, the first cylindrical section having an end surface connectable with an axle central tube;
   a tubular second cylindrical section integrally and coaxially formed with and extending in a direction away from the first cylindrical section, the second cylindrical section having a second outer diameter less than the first diameter of the first cylindrical section, the second cylindrical section having at least one bearing support surface with a bearing support diameter to receive and support a bearing assembly;
   a tubular transition section integrally and coaxially formed with and located between the first cylindrical section and the second cylindrical section;
   an annular shoulder portion integrally and coaxially formed in an end segment of the transition section adjacent the second cylindrical section, the shoulder portion having an annular shoulder surface for engaging an annular surface of the bearing assembly; and an annular profile located in the shoulder portion between the annular shoulder surface and the at least one bearing support surface, the annular profile defined by a surface having a third diameter that is not less than the bearing support diameter of the bearing support surface;

wherein the annular profile has a first radiused surface with a first radius located between the annular shoulder surface and the at least one bearing support surface, a second radiused surface with a second radius located between the first radiused surface and the at least one bearing support surface;

wherein the second radius of the second radiused surface is greater than the first radius of the first radiused surface; and wherein the ratio of the second radius to the first radius is at least 5:1.

15. An axle assembly for a heavy-duty vehicle, the axle assembly comprising: a central tube;
  an axle spindle for receiving at least one bearing assembly to support a hub for rotation relative to the axle spindle, the axle spindle fixed to the central tube, the axle spindle comprising:
  a tubular first cylindrical section having a portion with a first outer diameter, an end surface of the first cylindrical section being connectable with the central tube of the axle spindle;
  a tubular second cylindrical section integrally formed with and extending in a direction away from the first cylindrical section, the second cylindrical section having at least one bearing support surface for receiving and supporting a bearing assembly of the hub and having a second outer diameter less than the first outer diameter;
  a tubular transition section integrally formed with and located between the tubular first cylindrical section and the tubular second cylindrical section; and
  a chucking land pad formed in the tubular transition section, the chucking land pad for engagement with a tool to induce relative rotational movement between the central tube and the axle spindle during a friction weld operation;
  an annular shoulder portion integrally and coaxially formed in the transition section adjacent the second cylindrical section, the shoulder portion having an annular shoulder surface for engaging an annular surface of the bearing assembly; and
  the tubular transition section having a rate of change in section modulus taken at an axial location between adjacent sections spaced apart in 0.050 inch increments from the shoulder surface in a direction towards the end surface of the first cylindrical section varies no more than 14% for every rate of change in section modulus.

16. An axle spindle for a heavy-duty vehicle wheel end, the axle spindle for receiving at least one bearing assembly for supporting a hub for rotation, the axle spindle comprising:
  a tubular first cylindrical section having a portion with a first outer diameter, the first cylindrical section having an end surface connectable with an axle central tube;
  a tubular second cylindrical section integrally and coaxially formed with and extending in a direction away from the first cylindrical section, the second cylindrical section having a second outer diameter less than the first diameter of the first cylindrical section, the second cylindrical section having at least one bearing support surface with a bearing support diameter to receive and support a bearing assembly;
  a tubular transition section integrally and coaxially formed with and located between the first cylindrical section and the second cylindrical section;
  an annular shoulder portion integrally and coaxially formed in an end segment of the transition section adjacent the second cylindrical section, the shoulder portion having an annular shoulder surface for engaging an annular surface of the bearing assembly; and
  an annular profile located in the shoulder portion between the annular shoulder surface and the at least one bearing support surface, the annular profile defined by a surface having a third diameter that is not less than the bearing support diameter of the bearing support surface;
  wherein a rate of change in section modulus taken at an axial location between adjacent sections spaced apart in 0.050 inch increments from the shoulder surface in a direction towards the end surface of the tubular first cylindrical varies no more than 10% for every rate of change in section modulus.

17. A method of making an axle spindle for a heavy-duty vehicle, the method comprising the steps of:
  providing a hollow member;
  forming a first cylindrical section on the hollow member to have a portion with a first outer diameter;
  forming a second cylindrical section on the hollow member integrally with and extending in a direction away from the first cylindrical section, the second cylindrical section having a second outer diameter less than the first outer diameter;
  forming a transition section on the hollow member integrally with, and located between, the first cylindrical section and the second cylindrical section, the transition section tapering from the first cylindrical section to the second cylindrical section;
  forming a bearing support surface on the second cylindrical section, the bearing support surface for receiving and supporting a bearing and having a second diameter less than the first diameter;
  integrally forming an annular shoulder portion in the transition section adjacent the bearing support surface and having an annular shoulder surface; and
  forming at least one surface defining an annular profile in the annular shoulder portion between the bearing support surface and the annular shoulder surface, whereby the annular profile is defined by a third diameter that is not less than the second diameter of the bearing support surface;
  forming a chucking land pad on the transition section;
  machining away the chucking land pad to form a finished transition section.

18. The method of making an axle spindle of claim 17 further including the step of machining away the chucking land pad to form the finished transition section with an antilock braking system sensor bracket locator nub.

* * * * *